United States Patent [19]

Scalzi et al.

[11] Patent Number: 6,075,937
[45] Date of Patent: Jun. 13, 2000

[54] PREPROCESSING OF STORED TARGET ROUTINES FOR CONTROLLING EMULATION OF INCOMPATIBLE INSTRUCTIONS ON A TARGET PROCESSOR AND UTILIZING TARGET PROCESSOR FEEDBACK FOR CONTROLLING NON-SEQUENTIAL INCOMPATIBLE INSTRUCTION EMULATION

[75] Inventors: Casper Anthony Scalzi, Poughkeepsie; Eric Mark Schwarz, Gardiner, both of N.Y.; William John Starke, Austin, Tex.; James Robert Urquhart, Fishkill; Douglas Wayne Westcott, Rhinebeck, both of N.Y.

[73] Assignee: International Business Machines Corporation, Armonk, N.Y.

[21] Appl. No.: 09/040,671

[22] Filed: Mar. 18, 1998

[51] Int. Cl.$^7$ .................................................. G06F 9/455
[52] U.S. Cl. ................................ 395/500.44; 395/500.47
[58] Field of Search ......................... 395/500.44, 500.47, 395/500.48

[56] References Cited

U.S. PATENT DOCUMENTS

| | | | |
|---|---|---|---|
| 4,587,612 | 5/1986 | Fisk et al. | 364/200 |
| 4,638,423 | 1/1987 | Ballard . | |
| 4,763,242 | 8/1988 | Lee et al. . | |
| 4,794,522 | 12/1988 | Simpson | 395/500 |
| 5,051,888 | 9/1991 | Hansen et al. . | |
| 5,077,657 | 12/1991 | Cooper et al. . | |
| 5,481,684 | 1/1996 | Richter et al. . | |
| 5,560,013 | 9/1996 | Scalzi et al. . | |
| 5,574,927 | 11/1996 | Scantlin | 712/41 |
| 5,577,231 | 11/1996 | Scalzi et al. . | |

OTHER PUBLICATIONS

Fundamental Software, Inc. OPEN/370 1995 10 pages.

Primary Examiner—Kevin J. Teska
Assistant Examiner—Lonnie A. Knox
Attorney, Agent, or Firm—Marc A. Ehrlich; Bernard M. Goldman

[57] ABSTRACT

Preprocessing emulation methods utilizing search argument controls for a template routine address table in a target computing system. Target routines are stored in a target computing system for emulating incompatible instructions of an incompatible architecture which need not be recognized by the architecture of the target computing system. Preprocessing of template routines is preferrably executed on an Auxiliary Emulation Processor (AEP) which may access and patch (modify) some or all of the target instructions in any selected target routine and send them through a queue to a target processor for execution. Execution of the target routines on a target processor emulates the execution of incompatible instructions in an incompatible program in the incompatible architecture. The target processor feeds back results from the execution of target routines to modify any search argument being generated for a currently accessed incompatible instruction to allow the preprocessing selection among multiple target routines for any incompatible instruction currently executing on the target processor to represent any mode or state set by for the incompatible instruction. Another type of feed back from a currently executing target template routine enables non-sequential virtual addressing selection by the preprocessor's access of incompatible instructions during execution of the incompatible program to support incompatible instruction branches and incompatible authority controls. End routine controls are provided in the template routines for feedback synchronization of the accessing of each next incompatible instruction with execution results of each current incompatible instruction having its tempate routine currently executed by the target processor.

31 Claims, 16 Drawing Sheets

END ROUTINE

| OPCODE | |
|---|---|

FIG.6A

END ROUTINE AND DELAY

| OPCODE | |
|---|---|

FIG.6B

PATCH AND EXECUTE

| OPCODE | TARGET BIT LOCATOR | INCOMPATIBLE BIT LOCATOR | LENGTH |
|---|---|---|---|

FIG.7

PATCH

| OPCODE | TARGET BIT LOCATOR | INCOMPATIBLE BIT LOCATOR | LENGTH |
|---|---|---|---|

FIG.8

IFETCH RESET

| OPCODE | GPR CONTAINING NEW INSTR ADDR | |
|---|---|---|

FIG.9

SET PROGRAM AUTHORITY

| OPCODE | GPR CONTAINING NEW AUTH INFO | |
|---|---|---|

FIG.10A

SET DATA AUTHORITY

| OPCODE | GPR CONTAINING NEW AUTH INFO | |
|---|---|---|

FIG.10B

SET PROGRAM STATE

| OPCODE | GPR CONTAINING NEW STATE | |
|---|---|---|

FIG.10C

PREPROCESSING OF STORED TARGET ROUTINES FOR CONTROLLING EMULATION OF INCOMPATIBLE INSTRUCTIONS ON A TARGET PROCESSOR AND UTILIZING TARGET PROCESSOR FEEDBACK FOR CONTROLLING NON-SEQUENTIAL INCOMPATIBLE INSTRUCTION EMULATION

INTRODUCTION

The subject invention generally relates to emulation methods for enabling programs written for execution on a computer system built to one type of computer architecture to execute on a target computer system built to a different computer architecture. More specifically, the subject invention provides emulation methods which are may be preprocessed and executed solely on a target processor, or by a target processor utilizing an Asynchronous Emulation Processor (AEP) for preprocessing template routines for emulating incompatible instructions on a target computer system. The preferred embodiment described herein utilizes an AEP and target processor combination for generating addresses of, accessing, and preprocessing template target routines (templates) corresponding to incompatible instructions. The preprocessing patches, when necessary, target instructions in the template before sending them to the target processor for execution in the emulation process. Also, target processor feedback from the execution of target routines is utilized for controlling non-sequential addressing of incompatible instructions. Further, when non-sequential addressing occurs in the incompatible instruction stream during execution of an incompatible program, the feedback synchronizes its preprocessing operations with the target processor emulation operations that execute the incompatible program. An important characteristic of this invention is its improvement in emulation efficiency enabled by the selective use of multiple target routines for any single operation code used in the incompatible program being emulated. Multiple template routines for any incompatible instruction operation code allow the emulation processing to select minimal size target routines tailored to special operand characteristics of incompatible instructions, system modes, and acts of operations required in the incompatible architecture of an incompatible program when the target computer system is itself incapable of performing the emulated special operand characteristics, modes and acts.

INCORPORATION BY REFERENCE

This application incorporates by reference the entire content of each of the three following applications:
1) USA patent application Ser. No. 08/991,714 entitled "Preprocessing of Stored Target Routines for Emulating Incompatible Instructions on a Target Processor", filed on Dec. 16, 1997 by C. A. Scalzi et al.
2) U.S. Pat. No. 5,560,013 entitled "Method of using a Target Processor to Execute Programs of a Source Architecture that uses Multiple Address Spaces", filed on Sep. 24, 1996 by C. A. Scalzi and W. J. Starke.
3) U.S. Pat. No. 5,577,231 entitled "Storage Access Authorization Controls in a Computer System Using Dynamic Address Translation of Large Addresses", filed on Nov. 19, 1996 by C. A. Scalzi and W. J. Starke.

The above incorporated patents teach program emulation methods and mechanisms, some of which are used in the subject invention. Application Ser. No. 08/991,714 describes a program translation method which accesses, patches and executes incompatible instructions on a target processor, including emulation of all instructions, interruptions and authorizations of an incompatible program written for execution on another computer system built to a computer architecture incompatible with the architecture of the target processor's computer system. Its disclosed process allows the target processor to synchronously emulate all incompatible acts expected in the operation of an incompatible program when the target processor itself is incapable of performing the emulated acts. Each of the instructions, interruptions and authorizations found in the incompatible programs has one or more corresponding target routines, any of which may need to be preprocessed before it can precisely emulate the execution results required by the incompatible architecture. Target routines (corresponding to the incompatible instruction instances in an incompatible program being emulated) are accessed, patched where necessary, and executed by a target processor to enable the target processor to precisely obtain the execution results of the emulated incompatible program. Before preprocessing, each target routine may not be able to provide identical execution results as required by the incompatible architecture, and the preprocessing may patch one or more of its target instructions to enable the target routine to perform the identical emulation execution of the corresponding incompatible instruction. The patching and other modifications to a target routine are done by one or more preprocessing instructions stored in the target routine.

The U.S. Pat. No. 5,560,013 and 5,577,231 patents teach emulation methods using a target architecture having a much larger virtual address size than found in the emulated (source) architecture, and they trade virtual address space in the target system for emulated operational characteristics in the emulated architecture which may be alien to, and unrecognizable by, the target architecture, such as authority controls found only in the emulated architecture and not found in the target architecture. The embodiments in these incorporated patents emulate the complex IBM S/390 architecture, which contains elaborate storage access authorization mechanisms, for allowing an operating system to provide a programming environment which enforces strong integrity characteristics with regard to programs, and allows establishment of restricted data access domains. The more complex of such mechanisms generally have no counterpart in simpler target processor architectures, such as the Power PC and Intel CISC architectures. To provide the total operational execution environment of a complex incompatible architecture, the embodiments in these patents teach how the S/390 access authorization mechanisms may be emulated in a target machine not having these mechanisms. In more detail, these S/390 access authorization mechanisms include real storage access keys, storage access authority granted to programs, storage fetch-only authority, storage write authority, and address space access authority. These mechanisms must be properly emulated in a target processor to support a real S/390 operating scenario capable of executing S/390 application programs, in which the scenario includes OS/390 software, middleware programming, and the application programming.

BACKGROUND

U.S. Pat. No. 4,587,612 (Fisk, et al.) describes a system for accelerated instruction mapping of a program in the architecture of one system, called the source, to instructions of a different system, called the target. The translation is done by an independent processor provided for the purpose and executing concurrently, and in tandem with, the target processor. The processor doing the translation is called an Emulation Assist Processor (EAP). That patent teaches the substitution of specific register values, and immediate displacement values, from source machine instructions into target machine instructions which, either singly or as a sequence of more than one, perform the function of the source machine. The technique described cannot be used to provide a total operational S/390 program execution environment. It does not describe a method to access emulated source main storage. Complex source machine architecture, e.g. S/390, often contains elaborate storage access authorization mechanisms for allowing an operating system to provide a programming environment which has strong integrity characteristics with regard to other programs, and allowing establishment of restricted data access domains. Such mechanisms generally have no counterpart in simpler target processors. To provide the total operational execution environment of a complex source machine, such access authorization mechanisms must be emulated in the target machine.

Examples of such architected mechanisms in a S/390 embodiment are real storage access keys, storage access authority granted to programs, storage fetch-only authority, storage write authority, and address space access authority. These mechanisms must be properly emulated in a target processor to support a real S/390 operating scenario including OS/390 software, middleware programming, and applications programming.

U.S. Pat. No. 5,577,231 (Scalzi and Starke) describes an efficient method of providing such access authorization mechanisms for a source machine with, for example, 31-bit addressing architecture on a simpler target machine with a larger size addressing architecture, e.g. one with 64-bit addresses. The additional address bits provide the capability of emulating S/390 access authority mechanisms as part of the target machine virtual address. The target machine instructions executed to provide the function of source machine instructions do not require 64 bits in order to access the emulated virtual storage or main storage of the source machine. For example, to emulate S/390 source machines, only 31 bits of the target machine address are required as an offset or address into the emulated S/390 absolute main storage, and the basic addresses within an address space are only 31 bits. Excess high-order bits are used instead to emulate access under the various states of the source machine storage access controls. The source address, extended on the left by an access authority state, is called a target processor exploded virtual address. The high-order bits of the exploded virtual address represent the access authority of the source program making the storage request. On first reference to a particular location under a specific setting of the source access controls, a target page fault will occur. The emulator kernel, either a program or microcode, on the target machine will determine the validity of the access in resolving the page fault. If the access is invalid, the architected response for the invalid condition encountered is reflected to the appropriate source program as specified in the source machine architecture. If the access is valid, a Page Table Entry (PTE) is established for the exploded address so that the target page frame emulating the accessed source storage page may be accessed at full target machine processor speed without further intervention, as long as the PTE remains established for that target virtual page. The target processor exploded virtual address in the PTE represents two things in composite: the source machine storage address (either virtual or real), and the storage access authority under which the access was made and found valid. The instruction that caused the page fault is re-executed. Its and future accesses to the same source location under the same access authority occur at full target machine performance through the established PTE. If the same source storage location is then accessed from a different source storage access authority state, the target machine will use a different target virtual address to access the location. The exploded address used will be different than on the earlier access. In a S/390 embodiment, the low-order 31 bits will be the same as before, but the high-order bits will reflect a different source access authority state; for example, a different PSW storage access key. The target machine will not resolve the second target virtual address used with the PTE established for the first access, since the target processor address is different. The first time this second address is used, a page fault occurs, and the source access with the new authority state can be validated by the emulator kernel. If that access is also valid, a second, different PTE is established for the access from the second authority state.

U.S. Pat. No. 5,560,013 (Scalzi and Starke) describes an efficient programming method to apply the inventive concepts of U.S. Pat. No. 5,577,231 in the emulation of a complete program operational environment of a computing system with complex access authority mechanisms in its architecture; for example, to emulate a total S/390 program operating environment, including an operating system, middleware, and application programs. The machine language instructions of an alien source computer are translated, as encountered, in the emulated execution of a source computer program on a different target computer. A translation exists for each possible source processor instruction type, and consists of one or more target machine instructions that together will provide the function of the source machine instruction. As each source instruction is encountered, the target translation is accessed, and the target instructions of the translation are modified so that they are made to reflect the specifics of the particular instance of the source instruction, e.g. registers, addresses, displacements, etc. After this modification, the instructions of the translation are saved in a target storage area so that the instruction translation is not required on each execution of the same source instruction during the complete source program emulated execution. As long as the translation remains valid, the existing translation can be executed directly in place of the source instruction. A directory is maintained with an entry for each possible source machine instruction location. This directory indicates whether or not a valid translation already exists for each possible instruction instance. To execute a source instruction during emulated execution of the source program, a branch is taken to the directory entry for the source instruction. If a translation already exists, the directory entry contains a branch instruction to it. Otherwise, the directory entry branches to the instruction translation routine to create the necessary target translation for the source instruction.

Application Ser. No. 08/991,714 provides a program translation and execution method performed entirely on a target processor, which utilizes stored target routines (for execution by the target processor) corresponding to incompatible instructions, interruptions and authorizations of an incompatible program written for execution on another computer system built to a computer architecture incompatible with the architecture of the target processor's computer system. The disclosed process allows the target processor to emulate incompatible acts expected in the operation of an incompatible program when the target processor itself is incapable of performing the emulated acts. Each of the instructions, interruptions and authorizations found in the incompatible programs has one or more corresponding target routines, any of which may need to be preprocessed before it can precisely emulate the execution results required by the incompatible architecture. Target routines (corresponding to the incompatible instruction instances in an incompatible program being emulated) are accessed, patched where necessary, and executed by a target processor to enable the target processor to precisely obtain the execution results of the emulated incompatible program. Before preprocessing, each target routine may not be able to provide identical execution results as required by the incompatible architecture, and the preprocessing may patch one or more of its target instructions to enable the target routine to perform the identical emulation execution of the corresponding incompatible instruction instance to reflect its specific particulars. The patching and other modifications to a target routine are done by one or more preprocessing instructions stored in the target routine.

SUMMARY OF THE INVENTION

This invention provides emulation methods which improve upon the emulation methods taught in U.S. Pat. No. 5,777,231 to fully apply to a target emulation process many of the incompatible characteristics, modes and access authority states occurring during the execution of emulated incompatible programs, even though the characteristics, modes and access authority mechanisms are not designed into a target processor performing the emulation methods. The preferred embodiment for implementing this invention is a target processor to which is connected an asynchronous emulation processor (AEP) for asynchronously preprocessing the patching of selected template target instructions to emulate an incompatible program written for an incompatible architecture containing incompatible instructions which may utilize the incompatible facilities of the incompatible architecture not designed into the target processor. The AEP creates a target machine instruction stream that performs the function of the incompatible program. It should be understood that the AEP is preferred, but is not necessary to, the implementation of many of the claimed features of this invention; and the novel features described herein for operation by the AEP can instead be implemented entirely within the target processor without having any AEP. The choice of utilizing the AEP, or not, is an economic one. The present electronic technology finds the AEP utilization less costly. However, future electronic technologies which are expected to support cheaper instruction execution rates than current electronic technologies may more economically implement this invention entirely within a target processor without utilizing any AEP.

The execution environment for incompatible programs of some architectures, such as the IBM S/390 architecture, require complex, or different, authority mechanisms not found in the target processor which may not have hardware equivalents in its native machine operating environment, even though the target processor is required by this invention to have a larger virtual address range than the maximum specified in the incompatible program architecture, as is found in application Ser. No. 08/991,714.

In the currently preferred implementation of this invention, a target instruction patching function is performed in an asynchronous emulation preprocessor (AEP), rather than in the target processor. A process is provided for communicating to the AEP from a target processor executing the template routine (containing target instructions executed to perform the emulation). This communication provides special types of feedback signals, including signals for setting a high-order field in a target-processor virtual address, which is used in the AEP to fetch a next incompatible instruction in an incompatible program being emulated. The virtual-address high-order field represents an access authority state required in the incompatible program's architecture, but not supported in the target processor architecture.

The AEP interprets each incompatible processor instruction, looks up the address of a corresponding target processor template routine (template), processes the target instructions in the template to find any patch instruction(s), which the AEP executes against an associated target instruction in the template, and passes each target instruction, some modified by patching, to a Target Instruction Queue (TIQ), from which a target processor obtains the instructions in sequence for execution when operating in emulation mode. As the target processor obtains the target instructions from the TIQ, it executes the received instructions.

This invention also stores in the AEP special incompatible-architectural modes, and special incompatible-instruction characteristics, for controlling the selection of among plural templates available for the same incompatible instruction operation code. These incompatible-architectural modes and incompatible-instruction characteristics are stored as control states in the AEP as these states are communicated from a target processor as it executes predetermined target instructions in templates emulating certain types of incompatible instructions. These plural control states are used in the AEP to interpret each incompatible instruction in the formation of a search argument which can distinguish among plural template routines associated with the same operation code of the incompatible instruction.

By this invention enabling the storing of plural different template routines for the same incompatible opcode, this invention enables its preprocessing operation to select the template routine having the fewest instructions for the current operation code, which results in a faster execution of the incompatible instruction than obtainable by prior emulation methods. The prior emulation methods supported a single emulation routine per incompatible opcode, and this single routine had to contain all target instructions required to support all conditions of emulation execution for the opcode—resulting in a large and inefficiently executing emulation routine. In this manner, the subject invention enables more efficient target processor emulation routines to be designed which can now be tailored to support specified incompatible instruction modes and characteristics, without requiring a single template routine to handle all conditions, modes and states for the same incompatible opcode. Therefore this invention improves emulation efficiency by enabling the use of plural template routines for performing the emulation of different incompatible instructions utilizing the same opcode, each of these routines being tailored for the exact conditions if its incompatible instruction existing at the time of instruction execution.

Execution results of some template target instructions may be communicated from the target processor to the AEP to control changes in the execution sequence of incompatible instructions in the incompatible program, in the same manner as if the incompatible instructions were being executed on a processor designed to natively execute the incompatible architecture of the incompatible program. Thus, an incompatible program's instruction flow has the changes in its instruction characteristics, modes, and access authority states controlled, communicated, and synchronized between target processor emulation execution and the emulation preprocessing, such that the changes are properly reflected in the preprocessing (which may be performed in an AEP).

Special target instructions are provided by this invention, including an "end routine instruction" or an "end routine and delay instruction", one of which is provided at the end of each stored template routines, and it is the last instruction of each preprocessed template routine, so that the target processor will have an indication when it reaches the end of emulation for the corresponding incompatible instruction being emulated.

When either the End Routine target instruction, or the End Routine And Delay target instruction, is detected by the target processor, a test is made for any pending incompatible architecture interrupts. If such an interrupt is found to be pending, control is passed to an emulation interrupt handling program. Additionally, when the target processor encounters an End Routine and Delay instruction, the target processor sends an end routine feedback signal to the preprocessing controls (which may be in an AEP). Then the preprocessing controls delay their fetching of the next sequential incompatible instruction until the end routine signal is received, since this feedback signal may indicate a change in the address of the next incompatible instruction to be accessed for the incompatible program, which indicates a non-sequential flow in the instruction emulation of the incompatible program. Thus, this feedback signal indicates a change in the virtual or real address of the next incompatible instruction to be fetched for the incompatible program. For example, the next target virtual address is changed whenever the current incompatible instruction is a successful branch instruction or changes the program access authority state.

The execution of the End Routine and Delay instruction in a template routine synchronizes the preprocessing controls with the target processor for non-sequential instruction accessing in the incompatible program flow.

The feedback operation may control the preprocessing controls in either of two very different ways: One way changes the search argument for controlling the selection among plural target routines available for the current incompatible instruction. This type of feedback signal is useful in choosing the most efficient template routine when an immediately prior template routine (currently executing in the target processor) changes the mode or state of execution of its immediately following instructions in the incompatible program.

The other way changes the address of the next incompatible instruction to be accessed for the incompatible program. This is a type of feedback signal which changes the program flow in the incompatible program execution by changing the address of the next incompatible instruction (which may be in an incompatible instruction address register) to be emulated. Thus, a normally generated sequential instruction address is not used to access the next incompatible instruction in storage until after a feedback signal is received indicating completion of the currently executing target template routine when it has not changed the current sequential address, resulting from the target processor executing an end routine instruction, or an end-routine and delay instruction, in the currently executed template routine. This prevents the preprocessing controls from preprocessing incompatible instructions past a non-sequential change in the incompatible program's instruction flow.

In the preferred embodiment, incompatible data references to storage for the incompatible instructions are performed by the target processor using a Data Exploded Virtual Address Register (DEVAR), the high-order part of which reflects the current access authority state of the program in execution. The AEP uses an Instruction Exploded Virtual Address Register (IEVAR), the high-order part reflecting the executing program's access authority state for accessing incompatible instructions from emulated incompatible storage. Page faults that result from either an instruction access by the AEP, or a data access by the target processor, are handled by an emulator in microcode, or as a software program executing with the maximum access authority to system storage.

The emulation process accepts a page fault interruption, and checks the authority of the incompatible program to make accesses according to its current incompatible architecture state. If the access is valid, a Page Table Entry (PTE) is established for the appropriate hardware venue, AEP or target processor, and the incompatible instruction is refetched, or the target instruction making the access is re-executed, depending on what caused the page fault. Where the access is invalid, the specified response for the invalid access in the incompatible architecture is emulated to the incompatible program, and its flow is adjusted in the processing of the AEP, if necessary, as specified for that condition.

When execution of the finalized (by patching) target instructions results in a change in the access authority state of the incompatible program, the change is reflected appropriately in the IEVAR in the AEP and DEVAR in the target processor, to affect the accessing of the next incompatible instruction by the AEP after the change of state, and all subsequent data accesses to source storage by the target processor.

Changes in state are made by new special instructions executed by the target processor. These instructions, which are included where appropriate in the incompatible instruction target template routines, may be part of the hardware microprocessor, or may be microcoded instructions of the processor, or may simply be coded as calls to subroutines provided in the emulator to provide the required functions, or may be coded as macro-instructions and compiled as inline code to perform the required function.

In the preferred embodiment, an "end routine instruction" or an "end routine and delay instruction" is provided at the end of the stored template routines. When either is detected by the AEP, it causes the AEP to send to the TIQ an End Routine or End Routine And Delay target instruction as the last instruction for each preprocessed template routine, so that the target processor will have an indication when it reaches the end of emulation for the incompatible instruction being emulated. When either the End Routine or End Routine And Delay target instructions are encountered by the target processor, a test is made for any pending incompatible architecture interrupts. If such an interrupt is found to be pending, control is passed to the emulation program 107. Additionally, when the target processor encounters an End Routine and Delay instruction, the target processor sends an end routine signal to the AEP. After placing a End Routine and Delay instruction in the TIQ, the AEP delays fetching the next incompatible instruction until it receives the end routine signal from the target processor, since the emulation of the current incompatible instruction by the target processor may change the execution sequence in the incompatible program by emulation of its current instruction, which may change the virtual or real address of the next incompatible instruction to be fetched by the AEP. For example, the next target virtual address is changed whenever the current incompatible instruction is a successful branch instruction or changes the program access authority state.

The End Routine and Delay instruction in a template routine synchronizes the AEP and the target processor for non-sequential instruction incompatible program flow. Hence, the next sequential incompatible address of the next incompatible instruction generated by the incompatible instruction counter in the AEP may be changed by a replacement feedback address received from the target processor resulting from the emulation of the current incompatible instruction, and whatever next sequential address existed may be changed by the feedback signal received from execution of the current template routine containing an end-routine and delay instruction, which then delays whatever next instruction address then exists in the AEP from accessing the next incompatible instruction from storage until after the next instruction address is changed in the AEP by the feedback address. Thus, the AEP cannot preprocess instructions past a non-sequential change in the program's instruction flow, and will follow any non-sequential program flow determined by the incompatible program.

BRIEF DESCRIPTION OF DRAWINGS

The subject matter which is regarded as the invention is particularly pointed out and distinctly claimed in the claims at the conclusion of the specification. The foregoing and other objects, features and advantages of the invention will be apparent from the following detailed description taken in conjunction with the accompanying drawings which are:

FIG. 6A depicts the format of an End Routine instruction provided in each template routine and interpreted by the AEP.

FIG. 6B depicts the format of an End Routine And Delay instruction.

FIG. 7 depicts the format of a Patch and Execute instruction interpreted by the AEP.

FIG. 8 depicts the format of the Patch instruction interpreted by the AEP.

FIG. 9 depicts the format of a Ifetch Reset instruction interpreted by the AEP.

FIG. 10A depicts the format for a Set Program Authority instruction interpreted by the AEP.

FIG. 10B depicts the format of the Set Data Authority instruction interpreted by the AEP.

FIG. 10C depicts the format of a Set Program State instruction interpreted by the AEP.

DESCRIPTION OF THE DETAILED EMBODIMENT

Figure 1:
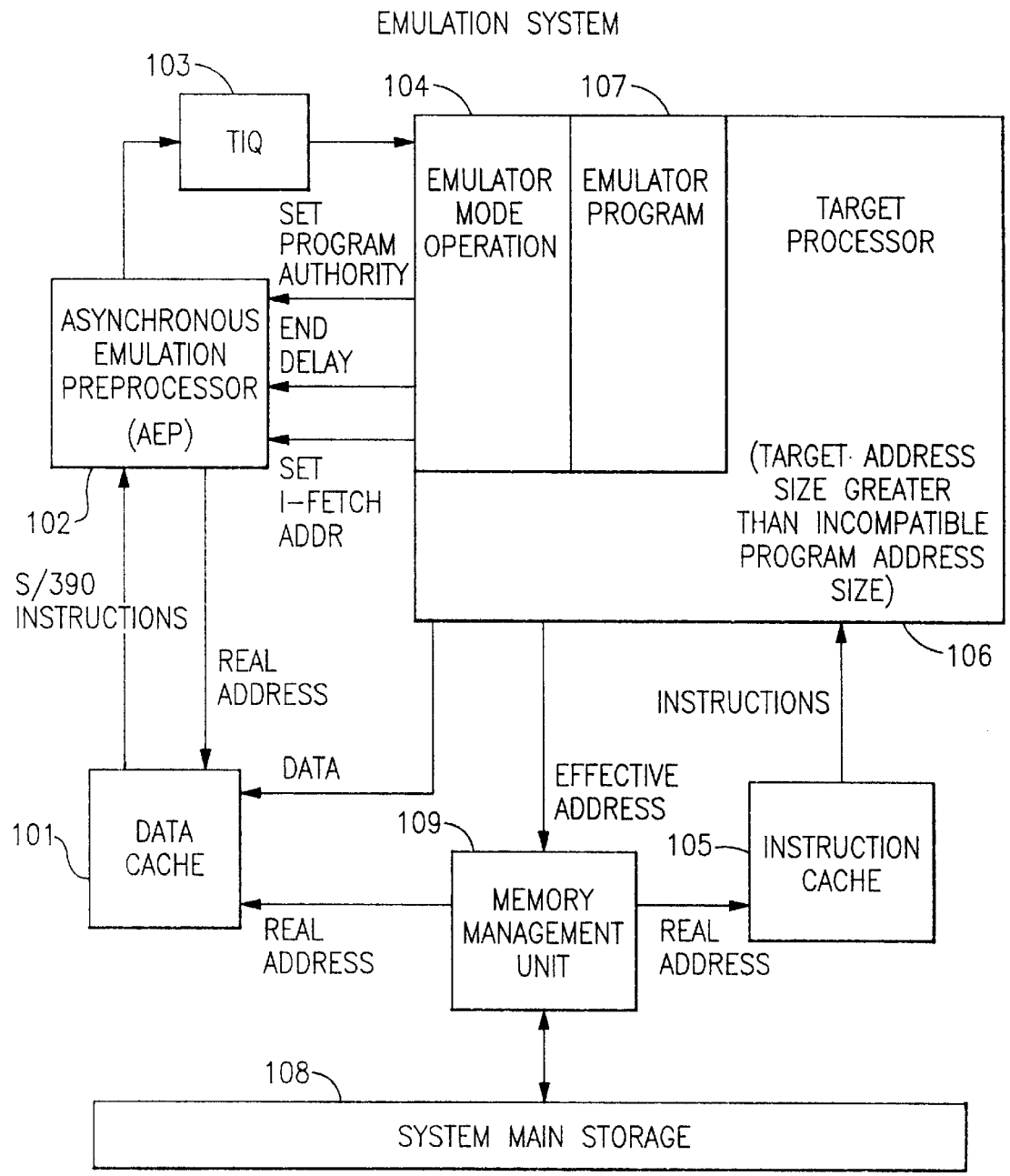
FIG. 1 illustrates system elements in which the invention operates.

FIG. 1 illustrates the major elements of the preferred embodiment of the invention which is described in detail herein, in which box 102 represents an Asynchronous Emulation Preprocessor (AEP) and box 106 represents the target processor.

AEP 102 preprocesses target instructions in template routines (hereafter called "templates") corresponding to incompatible instructions being emulated by the target system. The emulated incompatible instructions are in any incompatible program stored in the storage hierarchy of the target system. The incompatible instructions are accessed one-at-a-time from the target storage for processing by the AEP 102 to determine the address of a corresponding template also stored in the target system storage.

AEP 102 is a processor which need not be built to the same architecture as the target processor, and its machine instructions are herein called "AEP instructions" in the architecture of the AEP. Each template contains both "AEP instructions" (in the architecture of the AEP processor), and "target instructions (in the architecture of the target processor). Thus the AEP allows an emulation process to use templates which contain instructions designed for two different computer architectures, both of which may be different from the computer architecture of the incompatible instructions being emulated. Thus up to three different computer architectures may be involved in the emulation system and process of the preferred embodiment.

AEP 102 executes only the AEP instructions in an addressed template. The AEP instructions in any template control several different types of AEP processing of the template, including: 1) modifying (patching) one or more target instructions in the template, 2) determining when the end of the template is reached during the AEP processing, and 3) performing special functions unique to the incompatible instruction represented by the template which may be communicated back to the AEP.

AEP instructions in a template routine may be associated with a target instruction in the template for modifying the target instruction into a different form to be executed by the target processor. Sometimes a target instruction in a template may not be modified (patched) by any AEP instruction. All target instructions in a template are processed by the AEP, but only the AEP instructions are processed there. The AEP modifies the target instructions in the template to reflect the specifications in the current instance of the incompatible instruction to be executed, and sends them to the target processor for execution, through Target Instruction Queue (TIQ) 103. Thus a template containing one or more target instructions is obtained by the AEP for each incompatible instruction. Each significant specification variation of an incompatible instruction format may have a different template, e.g., whether or not a register specification is coded as null.

The target instructions in the TIQ 103 represent the functions of the incompatible instructions they replace, in the target instruction stream being sent to an Emulator Mode Operation 104 of the target processor.

Figure 2:
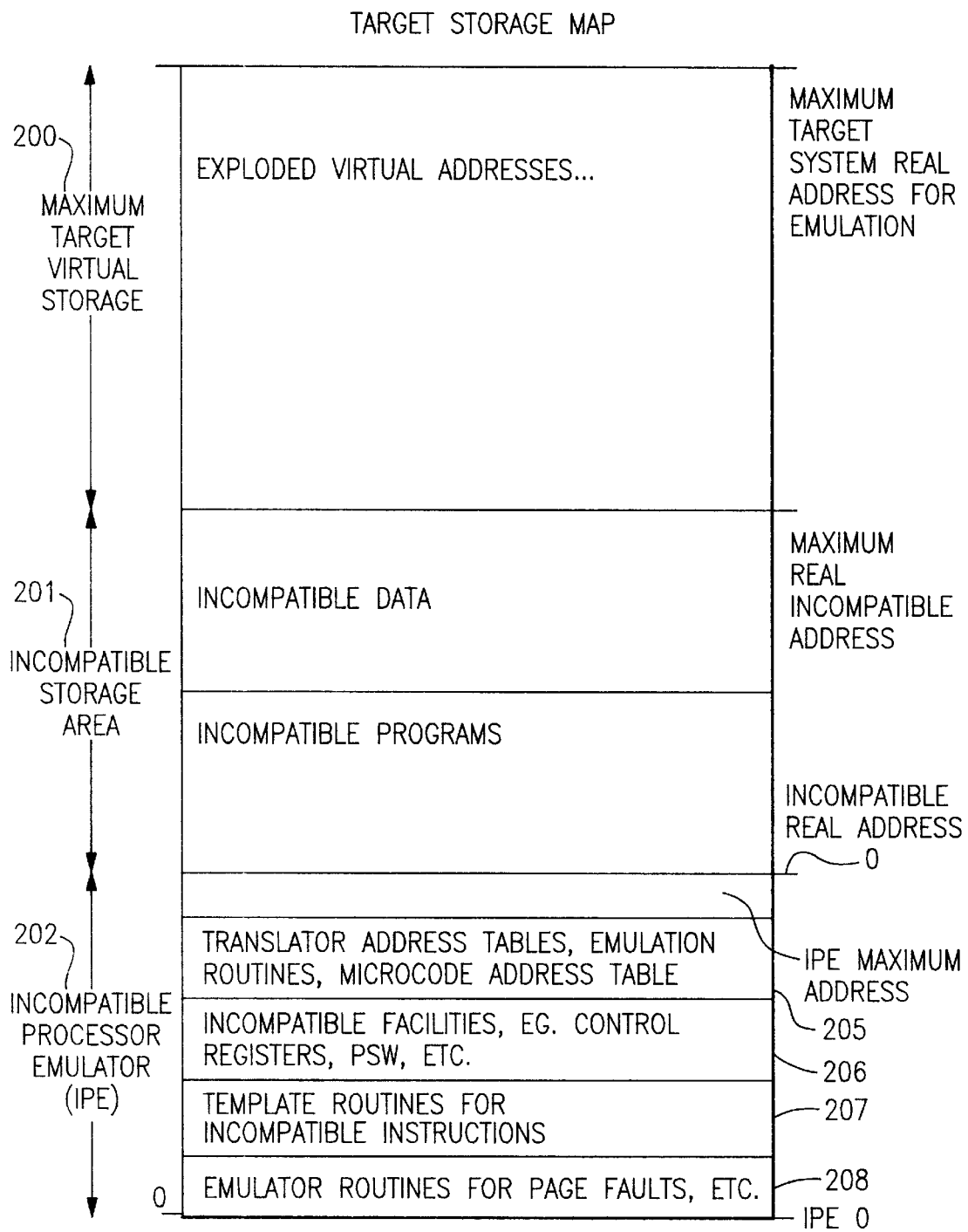
FIG. 2 illustrates mapping of major areas of absolute storage utilized by the preferred embodiment.

The AEP fetches the incompatible instructions of an incompatible program from an incompatible instruction storage area 201 in FIG. 2 found in the target processor's storage. Each incompatible instruction is transferred through a target system data cache 101, which accesses a target system storage 108 through a Memory Management Unit (MMU) 109 which may be conventionally constructed.

When execution of the target instructions of a template may result in a change in the control flow of the incompatible program, or a change in the access authority state of the incompatible program, the AEP does not go forward in its interpretation of incompatible instructions. The target processor signals the AEP after the execution of each such instruction has been completed, since it affects the AEP processing by changing either the order of incompatible instructions (and the accessing of corresponding templates), or the address of the templates to be accessed in the target system storage. Alternate embodiments may perform a tentative preprocessing beyond a point of possible change in flow, as will be discussed later.

Target instructions generated by the AEP to perform all of the functions of the translated incompatible instruction are accessed by the target processor from the TIQ 103, which receives them from the AEP 102.

For the emulation process, the target processor also executes target instructions which are not part of the templates that are needed by the target processor to perform emulation, such as for emulator mode operations 104 and for an emulator program 107. These non-template target instructions are accessed from system storage under control of the target processor's operating system programs, as necessary, through the instruction cache 105 of the target processor. Emulator mode operations 104 controls how the target processor operates in emulation mode to obtain each next target instruction from TIQ 103 for execution by the target processor, and emulator program 107 handles exceptions in the execution of each of these obtained target instructions by the target processor.

FIG. 2 shows a target system storage area (in the target system's real storage) assigned for use by the emulation process. This emulation area includes three contiguous storage areas 200, 201 and 202, which are shown contiguously in target system storage from a target system real address (shown as IPE 0) in the target system storage. Area 202 is assigned as an "incompatible processor emulator" (IPE) area for containing emulation control processes used by the target processor, including emulator routines used for controlling page faults of each incompatible program currently being emulated. Area 202 contains sub-areas 205, 206, 207 and 208. Sub-area 208 contains "emulator routines" for handling page faults caused by the incompatible program, etc. Sub-area 205 contains "translator address tables", "emulation routines", "microcode address tables", etc. involved in address translations within the incompatible program during its emulation, such as those responding to incompatible program page faults. Sub-area 206 contains "incompatible facilities" used in processing the incompatible program, such as control registers, program status words (PSWs), etc. defined by the incompatible system architecture used by the current incompatible program being emulated. Sub-area 207 contains all of the template routines stored in the preferred embodiment. These areas and sub-areas are preferred to be located contiguously in the target system storage, but such storage contiguity is a preference and not a requirement of the subject invention.

To address an incompatible program real address in the target system storage, the target real address assigned as incompatible storage location zero must be added to the incompatible program real address. An implementation of this preferred embodiment allocates an incompatible system real address (herein called IPE 0) as the beginning of the contiguous emulation area, when such contiguous expanse of storage is available in the target system.

To support emulation of the incompatible machine programs, the AEP 102 accesses each next incompatible instruction addressed by a source machine instruction counter 304 (shown in FIG. 3) at an incompatible address located in the target system storage area 201. Access of the incompatible instruction is made using a target processor exploded virtual address which reflects the current access authority state of the incompatible program. After access, the AEP interprets that instruction as an incompatible machine instruction and, using the operation code and other particulars of the incompatible instruction, determines a lookup value to find a target processor template routine for that particular incompatible instruction instance. The template routine includes target instructions which perform the functions of the incompatible instruction, as specified in the incompatible architecture definition. The template routine also includes special instructions which modify the regular instructions of the template to make them reflect the specifications of the incompatible instruction instance before they are executed by the target processor. Information from the incompatible instruction that modifies particulars of the target instruction(s) is called "patch information". The special instructions are called the "Patch instructions". They are executed in AEP 102, and are not passed to the target processor for execution.

Figure 3:
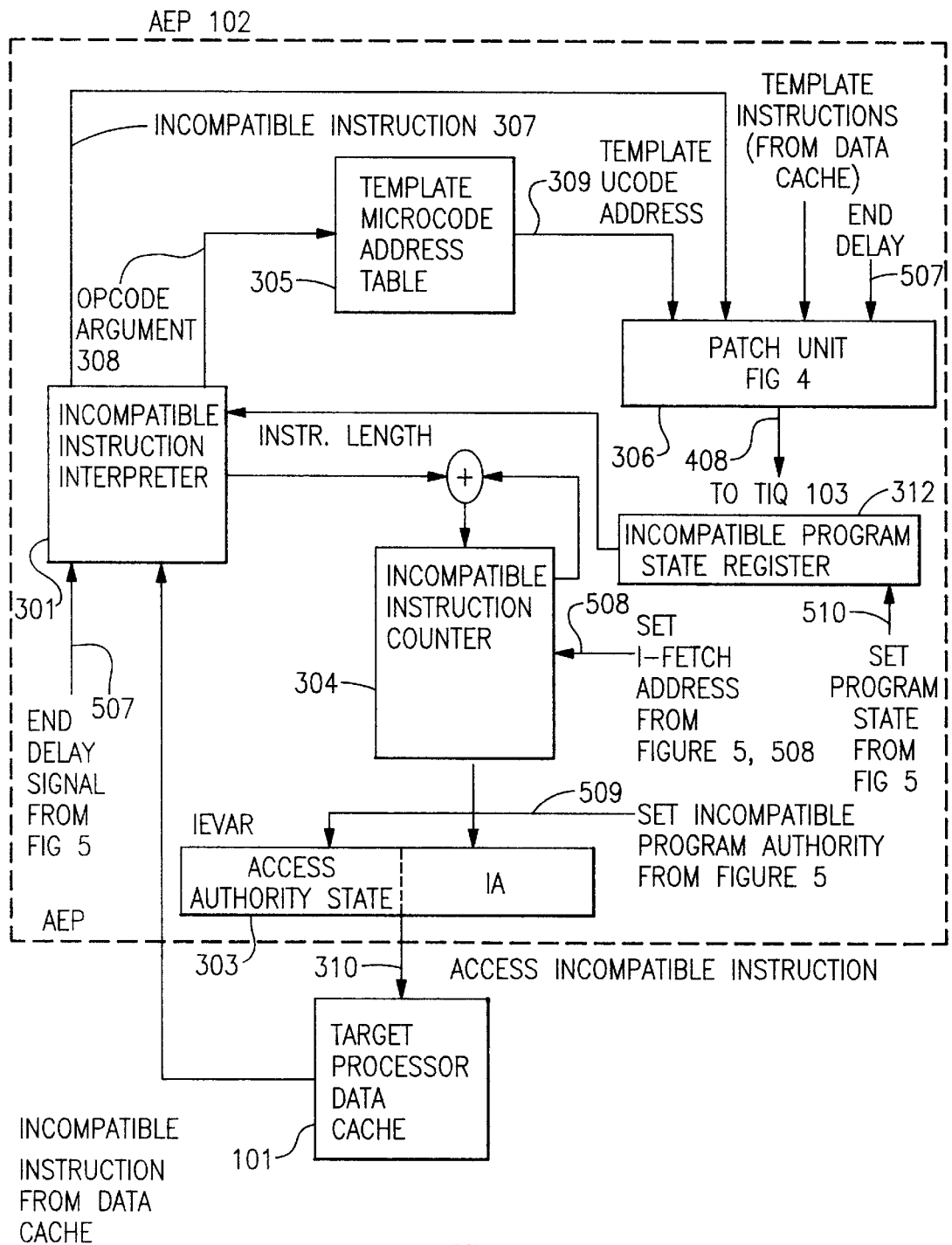
FIG. 3 depicts the logic elements of an auxiliary emulation preprocessor (AEP) used in emulating an incompatible program.

FIG. 3 shows major elements of the Asynchronous Emulation Preprocessor (AEP) 102. An incompatible instruction interpreter 301 fetches each incompatible instruction from a target processor data cache addressed by incompatible instruction counter 304 using the target processor exploded virtual address in an Instruction Exploded Virtual Address Register (IEVAR) 303, provided to the cache on line 310. The generation of Exploded Virtual Addresses is explained in U.S. Pat. No. 5,577,231 previously discussed herein. The target storage virtual address in the incompatible instruction counter 304 is placed in a low-order part of IEVAR 303, and a high-order part is provided on a line 509 from FIG. 5 which represents an incompatible program authority value, such as representing an assigned incompatible virtual address space, any assigned incompatible storage key value, and any other authority parameters which may be required in the incompatible architecture. The virtual address in IEVAR 303 is address translated to access the target systems real storage shown in FIG. 2.

The addressed incompatible instruction is accessed by the target processor from the target system storage and is received in an incompatible instruction interpreter 301. Interpreter 301 generates a search argument which is sent on line 308 to a microcode address table 305, in which the search argument is used to look up the address of a template routine in area 207 in the target system storage. The search argument is generated by combining the opcode of the accessed instruction with a mode/state qualifier and a null/non-null qualifier. The mode/state qualifier represents fields indicated as having an on-state in IPSR 312. The null/non-null qualifier is generated by interpreter 301 scanning each operand field in the accessed incompatible instruction to determine if an operand component has a null value. The generated search argument is then sent to a Microcode Address Table 305 to find the address of the required template routine to be used for emulating the accessed incompatible instruction. After interpreter 301 finds the template microcode address, it is provided on line 309 to a Patch Unit 306.

Also the incompatible instruction is itself provided to the Patch Unit 306 on a line 307, where the incompatible instruction is to be a source of patch information, i.e., input data for patch operations within target instruction(s) of the addressed template routine. The operation of the Patch unit is explained using FIG. 4. The addressed template routine contains one or more target instructions and may contain one or more patch instructions. Each template routine must contain at least one target instruction, and need not contain any patching instruction. Whether a template routine contains patching instruction(s) or not, the target instructions sent by the template routine to TIQ 103 must always be executed in the target processor to precisely generate the exact function and results for each accessed incompatible instruction as defined by its incompatible architecture.

The patch unit 306 sequentially examines each instruction in the addressed template routine, whether it is a target instruction or a patch instruction. Each patch instruction is used to modify an associated target instruction in the template routine, and any number of patch instructions may be used to modify a single target instruction, although usually only one or two patch instructions are used to modify the same target instruction. After all associated patch instructions have completed their modification of the associated target instruction, the modified target instruction 408 is then sent to TIQ 103.

Some target instructions in a template routine will not have any associated patch instruction, and each such target instruction is sent to TIQ 103 without modification by the patch unit 306.

The target processor accesses each target instruction from TIQ 103 in the order that the target instructions were placed on TIQ. Then, the target instruction is executed in the target processor to contribute to the emulation of the corresponding incompatible instruction. Some target instructions received from TIQ 103 may signal changes in the sequential program flow of the incompatible program, such as instruction branches. Other received target instructions may generate control state changes in the incompatible program, such as by indicating a change in the current access authority state of execution by the incompatible program or a change in a program protection key. Such emulated control indications, and others, are generated by special emulation target instructions and are signaled to AEP 102 by the target processor on lines 507, 508, 509 and 510 from the target processor's instruction execution unit 504 in FIG. 5, which provide feedback to the AEP 102 for controlling operations by the AEP for incompatible instructions of the incompatible program. Line 508 sends a "set I-fetch" signal to the incompatible instruction counter 304 to switch the sequential sequence of incompatible instructions in the incompatible program being emulated, such as in response to a branch type of incompatible instruction. Line 509 sends a signal to IEVAR 303 to set to the new access authority value in its high-order field, which for example is used in the emulation of S/390 programs to control the S/390 address space to be used by the next incompatible instruction to be accessed.

Line 507 is controlled by execution of an "End Routine and Delay" instruction by the target processor. The End Routine And Delay instruction must be coded as the final template instruction for any incompatible instruction that may change the program access authority state of the incompatible program, or may change the sequentiality of execution of the incompatible program. This instruction is passed through to the TIQ by the AEP. When it is encountered in target processor processing, the AEP is notified so that it is aware that that point of execution has been reached, and that the new program state or the new access authority state has been set in the emulation registers it uses. This instruction may be implemented as a target branch instruction to code in the emulator to perform the signaling, or it may be a micro-coded special emulation mode instruction in the target processor. When the target processor executes a delay instruction, it will signal the AEP that the current address in the Incompatible Instruction Counter 304, and now in the IEVAR 303, can be used to access the next incompatible instruction in target storage. As such, the delay instruction performs a special synchronization of the emulation operations between the target processor and the AEP 102.

Incompatible Program State register (IPSR) 312 stores modes and states generated by one or more prior emulated incompatible instructions. These modes and states stored in IPSR 312 may affect at least the selection of the next template routine to be accessed by the AEP for the next incompatible instruction to be emulated by the target processor. These stored modes and states affect the selection among plural template routines available for the opcode of the instruction in interpreter 301, which is to be selected and accessed next by the AEP, and these stored modes and states may affect the selection of template routines for a sequence of following incompatible instructions. The fields in IPSR 312, any of which may be a single bit, are selected and set on by feedback signals received on line 510 from the target processor's instruction execution unit 504.

The content of IPSR 312 is used to generate one or more parameters for the search argument to be used for finding the best template routine for the incompatible instruction in interpreter 301. These parameters are used directly by concatenation with the opcode of the instruction in interpreter 301, or they may be otherwise combined by interpreter 301 for generating the search argument for a table lookup in table 305 to find the address of the best target routines corresponding to the opcodes of the incompatible instruction instances. This feedback use of results of incompatible program execution in determining which template routines to use can control the incompatible instruction stream and reduce the number of target instructions which are executed to emulate the incompatible instruction instance.

For example, in the case of emulation of S/390 programs, IPSR 312 may contain a bit indicating whether those programs are operating in access register (AR) mode or not. This avoids having each template routine contain additional target instructions for testing for this mode, which are now indicated in IPSR 312 and therefore need not be tested by target instructions in each template routine. In S/390 architecture there are many other addressing modes, for example, home space mode and secondary space mode, which also may be indicated by other mode bits in IPSR 312, to control the selection of template routines to provide proper and efficient execution paths. Also, IPR 312 may contain other bits for indicating whether supervisor or problem state exists in the emulated program. Thus, a variety of state bits may be provided in IPSR for controlling the emulation of incompatible instructions, such as may be done for kernel programs operating in supervisor state, so that their corresponding templates may avoid having to contain target instructions, and associated patch instructions, for controlling the execution state for each template. This may greatly speed up the emulation processing by the target processor.

Accordingly the state of the fields in IPSR 312 control the selection of template routines by being reflected in the formation of each search argument provided for a table lookup. This allows the emulation to use multiple template routines for the same incompatible instruction, allowing the stored modes and states to control the selection of the most efficient template routines for emulating the incompatible program.

Thus, a template routine addressed for an incompatible instruction when its incompatible program is in supervisor state will allow emulation of the instruction by one template routine. But a different template routine will be addressed if the program operates in problem state which will only perform error-reporting steps of the incompatible architecture, since the incompatible architecture does not allow the instruction to be executed in problem state. Therefore, different IPSR settings of execution state variables may be used with the same incompatible instruction opcodes to generate different lookup arguments as table lookup parameters to allow different template routines to be accessed, which are tailored to the indicated execution state in force at the time the incompatible instruction actually executes, and thus the template routines can contain a minimum number of patch instructions and/or target instructions to be executed.

Likewise, in special cases where one or more fields in an incompatible instruction have a frequently used value, such as the null (or zero) value, separate template routines may be designed to take advantage of the frequently used specification. If a field in an incompatible instruction need not be handled because it is zero, the corresponding template routine need not contain target instructions for handling that value, and then the template can contain fewer target instructions to be executed. In this manner, the same incompatible opcode may have a selection of different template routines, depending on whether or not a null specification is detected in the incompatible instruction—one template for handling the non-null case, and another template with fewer target instructions for handling the null case. For example if a S/390 incompatible program is being emulated, certain S/390 instructions specify two registers, a base register and an index register, and an immediate displacement field, the contents of which take part in operand effective address calculation. Frequently, only one register is actually specified, and often a zero displacement and/or a zero index is coded, in which cases the corresponding template can avoid containing target instructions for adding the zero value(s) to the non-zero value in the incompatible instruction.

When the preprocessing operations of AEP 102 recognizes such null specifications in an incompatible instruction, interpreter 301 may obtain a parameter corresponding to the null specification, and combine that parameter with the opcode of the incompatible instruction for generating the table lookup argument for the instruction, which argument may also receive other parameters representing, for example, processor modes and states which are to be reflected in the search argument to select among a plurality of template routines used by the same opcode. After the search argument is completely constructed by interpreter 301, it is used in table 305 to find the proper template routine address for most efficiently handling the incompatible instruction. One way to generate the search argument is for interpreter 301 to obtain the opcode and extend it with plural bits, each representing a respective frequently-used null condition for the incompatible instruction supported by having a unique template routine respectively stored for the opcode. Each such bit is set to an on-state to indicate whether the respective null condition exists for the instruction. The search argument may be further extended by other bits representing different modes of operation supported in IPSR 312 for that opcode, and those modes bits which are set on will indicate an active state for the respectively represented mode for executing the instruction, so that the search argument has all required information for a table lookup to find the address of the most efficient target routine for emulating the incompatible instruction.

The template routines tailored for the different conditions which may be represented in the search argument have fewer target instructions than a template routine written to handle all conditions which may exist for an opcode. Faster execution is obtained by the target processor executing the reduced number of target instructions for emulating an incompatible instruction.

Hence, this invention enables having multiple template routines for any incompatible instruction opcode, when the incompatible instruction instances using the same opcode can have any of plural conditions, such as different forms of instructions using the same opcode, and operate under different modes and/or states of operation indicated in IPSR 312.

Figure 4:
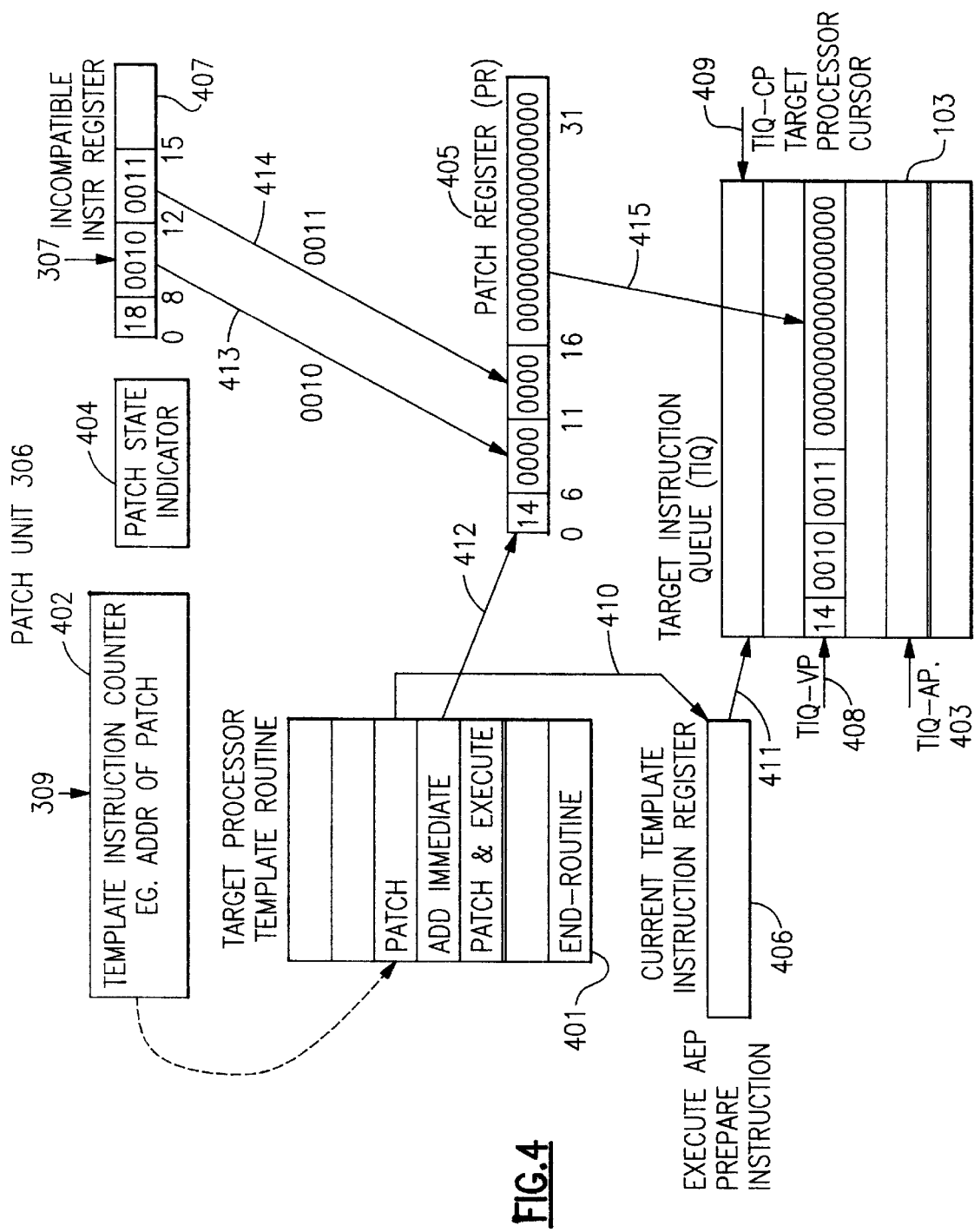
FIG. 4 depicts a general example of operations in a patching unit in the AEP for performing emulation preprocessing that modifies template instructions in a target processor template routine.

FIG. 4 illustrates the preprocessing by operations of the AEP patch unit 306, in which template routine 401 is the memory-stored template routine addressed by the last looked-up template microcode address provided on lines 309. Any of the template routines stored in the target system is represented by the set 401 of template instructions. A template Routine Instruction Counter 402 in unit 306 sequentially addresses the template instructions in the currently-addressed template routine, and the addressed template instruction is accessed by the AEP one-at-a-time and processed. Unit 306 initially determines whether the accessed template instruction is a patch instruction or a target instruction.

The patch instructions may be of the type disclosed in U.S. patent application Ser. No. 08/991,714, previously cited herein. Each patch instruction defines a field in an associated target instruction, and also defines a field in the current incompatible instruction which is to overlay the defined field in the target instruction to modify it. The associated target instruction may proceed or follow each of one or more associated patch instruction(s), as long as the patch instruction(s) are adjacent to the associated target instruction without any other target instruction intervening between the patch instruction and its associated patch instruction. The set of patch instructions associated with one target instruction is ended by a "patch and execute" instruction, which may be its only associated patch instruction. The patch and execute instruction transfers the instruction to a currently available location in TIQ 103.

If a template target instruction has no associated patch instruction, the template target instruction is immediately transferred to the currently available location in TIQ 103, and the target instruction is not modified by patch unit 306. Hence, a target instruction in a template routine may or may not be modified by the patch unit.

Thus, the Target Instruction Queue (TIQ) 103 receives each of the target instructions supplied by the AEP for execution by the target processor, regardless of whether a target instruction is modified by operation of the AEP. A current pointer (TIQ-CP 409) in TIQ 103 is a cursor on the TIQ locating the next target instruction to be executed by the target processor's instruction execution unit 504.

Management of the TIQ-CP pointer 409 is the responsibility of the target processor, but pointer 409 is used by the AEP to validate if the AEP can store its next preprocessed target instruction at a location indicated by TIQ-VP 408, so that the AEP has the assurance that it will not over-write any target instruction in the TIQ not yet executed by the target processor. AEP 102 manages the two other pointers, TIQ-AP (Available-Pointer) 403 and TIQ-VP (Valid-Pointer) 408.

TIQ-AP 403 is used to indicate the first location in the TIQ free to receive a new target instruction from the template routine. Before a new instruction is placed into that queue location, the TIQ-AP value is compared to the TIQ-CP, and if they are equal, the AEP cannot place a new instruction in the queue, but must wait until the processor has advanced beyond that point in its execution of instructions from the queue.

TIQ-AP 403 is incremented each time a new instruction for processor execution is placed in the TIQ slot addressed by TIQ-AP 403 Then the TIQ-AP is incremented to the next instruction position in the TIQ, and the test made for equality with TIQ-CP to assure the TIQ-AP does not overrun the TIQ-CP location.

TIQ-VP 408 is used to indicate the next location in the TIQ at which the AEP is to store its next template target instruction after any modifications to it are completed. TIP-VP 408 is used to delay the target processor if it attempts to execute a target instruction from a TIQ instruction location that does not contain a valid target instruction. Before executing an instruction, the processor compares the new TIQ-CP value (for the next instruction it will execute) with the value of the TIQ-VP. If they are equal, the processor must wait until they are again unequal. In the embodiment described, the TIQ-VP and the TIQ-AP are identical. They are shown separately because in other embodiments the AEP may process incompatible instructions that the processor may not be made aware of in all eventualities.

In that case the TIQ-VP is maintained at the point where it is safe for the target processor to access a template instruction for execution. The TIQ-AP is used internally by the AEP to keep its current place in the TIQ in alternate embodiments. For example, an AEP may process incompatible instructions beyond a conditional branch instruction, by choosing one of the paths, successful or unsuccessful, and continue preprocessing incompatible instructions down the selected path in the incompatible program. The processor can not be made aware of the target instructions resulting from this speculative preprocessing, until the actual result of the branch is later known. If the AEP has guessed correctly, the already produced target instructions in the TIQ beyond TIQ-VP can be revealed by moving TIQ-VP beyond them. Otherwise, they are discarded, the TIQ-AP is set equal to the TIQ-VP, and the AEP must start down another path of the incompatible program in its processing.

The Template Routine Instruction Counter (TRIC) 402 initially receives the address of the current template routine (which is the address of its first template instruction for the current incompatible instruction in an Incompatible Instruction Register (IIR) 407). The template routine, which is in storage, is accessed through the target processor's data cache.

These target instructions are processed one at a time by the patching unit. As instructions of the template are processed, the TRIC 402 is incremented to address the next instruction in the routine. An example is given in the Figure of a translation of a S/390 Load Register instruction to a Power PC Add Immediate instruction, which is a case of executing one target instruction in the processor to perform the function of one incompatible instruction, which is simple to use as an illustration. In the general case, however, many-for-one routines should be frequent, and the process supports them well.

The example routine shown contains more than one instruction, however, since the one functional target instruction to be executed must be made to reflect the specifications of the incompatible instruction instance whose function is to perform. It must be "patched".

The instruction addressed by the TRIC 402 is loaded into the Current Template Instruction (CTIR) register 406, where its target processor operation code is examined. If it is not one of the instructions: Patch or Patch and Execute, the instruction is transferred to the TIQ to be executed by the processor, illustrated by line 411. If the instruction is a Patch or Patch and Execute, an instruction in the template must be modified by a specified field in the incompatible instruction, e.g., a register number specification, or an immediate value are obtained from the incompatible instruction. Target Instructions to be patched are moved to the Patch Register (PR) 405, where the patch information is applied to modify the template target instruction.

The Patch State Indicator (PSI) 404 indicates whether a patch instruction is in Patch Register (PR) 405. When a Patch instruction is to be executed by the AEP, the PSI is tested. If it is off, the next instruction in the template routine must be moved to the Patch Register 405. After the processor has moved the next target instruction to PR 405, the patching operation specified in the Patch instruction is performed, and PSI turned on to indicate that an instruction is already in the PR 405.

If the PSI is on, an instruction is already in the Patch Register 405, and the additional patching operation specified by the current Patch instruction is performed on it. In this manner a target instruction can be patched by multiple Patch instructions in the template routine. In any case, the next instruction in the routine is accessed to CTIR 406 and examined.

The next instruction is either a Patch instruction, or a Patch and Execute instruction. In either case, the instruction specifies a field in the incompatible instruction in IIR 407 that must modify the target instruction in the PR 405. The length of the field and the starting offset for the fetch of bits from 407, and the offset for the overwrite into 405 are specified in both the Patch and the Patch and Execute instructions. See FIGS. 7 and 8 for the instruction formats. If the instruction is a Patch, the target instruction remains in the PR 405 for further patching by another instruction in the routine. In this case, the next instruction in the template is accessed to CTIR 406 and examined. It may be a Patch instruction or a Patch and Execute instruction. The final patch operation to a target instruction is performed by a Patch and Execute instruction which performs the patch operation it specifies and then transfers the target instruction that was the subject of the patching to the TIQ 103 for later execution by the target processor. Note that the Patch and Patch and Execute instructions execute their function while they are in the CTIR 406, and never enter the TIQ themselves. They are special Patch unit instructions and execute there. They prepare other target instructions for execution by the processor. These other instructions are placed in the TIQ by the action of the Patch and Execute instruction.

The End Routine instruction, the format of which is depicted in FIG. 6A, marks the end of the template routine. The AEP places this special emulation-mode target processor into the next available position in the TIQ at TIQ-AP and then proceeds to preprocess the next instruction in the incompatible program. The End Routine and Delay instruction, whose format is depicted in FIG. 6B, also a special emulation-mode target processor instruction placed into the next available position in the TIQ at TIQ-AP, is used to request the target processor to notify the AEP when it is reached for execution.

The AEP waits for that signal before proceeding to the next instruction in the incompatible program. In that way, the template routine can synchronize the operation of the AEP with the actual execution of the instructions of the incompatible program being emulated. When executed by the processor instruction execution unit, it results in a signal to the AEP on the End-Delay line 507. It indicates to the AEP that the next incompatible instruction may be preprocessed.

The End Delay signal can be implemented in hardware, but this is not necessary. A field in system storage may be used as an indicator. When the AEP reaches an End Routine and Delay instruction, it can set the field to the delay state, and keep testing it for a change back to not-delayed state. In the processor, execution of the End Routine and Delay instruction will set this field to the not-delayed state, freeing the AEP to preprocess more incompatible instructions, using the then current access authority state of the incompatible program and its current instruction counter value.

In the specific example shown in FIG. 4, the incompatible instruction is a S/390 Load Register instruction and the template will create a Power PC Add Immediate instruction that performs the same function. Two fields from the incompatible instruction will modify the target instruction before it will properly perform the same function. Box 401 depicts the template routine for the Load Register to be executed on a Power PC processor. The numbered lines 410–415 show the flow of the target instructions being processed in the Patch unit. The line 410 shows the loading of the first instruction of the template to the Current Template Instruction register (CTIR) 406. It is interpreted to be a Patch instruction. If the Patch instruction has not been preceded by another Patch instruction, it causes the next instruction in the routine to be loaded into the Patch register 405, as indicated by line 412. The Patch State Indicator (PSI) 404 indicates whether or not this is the first Patch instruction since a Patch and Execute instruction ended a previous series of Patch instructions.

In FIG. 4, the Patch instruction's patching action is depicted by line 413. The field that the Patch instruction specifies in the incompatible instruction is moved from IIR 407 to overwrite the target instruction field in PR 405 as also specified in Patch. Since the instruction is Patch, and not Patch and Execute, the target instruction remains in the PR 405. Assuming the Patch to be the first of a patching series, the next template routine instruction is then loaded into CTIR 406, again on line 410. In this example, it is interpreted to be a Patch and Execute instruction, though in the general case it can be another Patch instruction. Since the PSI 404 is on, the patch operation specified in the Patch and Execute is performed on the instruction in the PR 405. Its first action is depicted by line 414, replacing a second field in the target instruction in 405 with a different field from the incompatible instruction in 407.

After the patch operation is complete, its second action, depicted by line 415, is to move the patched instruction from PR 405 to the TIQ entry currently addressed by TIQ-AP, which is then incremented by the length of the target instruction moved to the TIQ, following a test of TIQ-CP.

For example, in emulating S/390 on a PowerPC, the S/390 LOAD REGISTER instruction is emulated by a PowerPC ADD IMMEDIATE instruction. The S/390 LOAD REGISTER, shown as the content of the incompatible instruction register 407 in FIG. 4, is two bytes in length. Bits 0–7 contain the Opcode ('18'x), bits 8–11 contain the R1 register, or target, and bits 12–15 contain the R2 register. In the example presented in FIG. 4, R1=2, and R2=3. The PowerPC ADD IMMEDIATE instruction, shown as the target instruction loaded into the patch register by the Patch instruction in FIG. 4, is four bytes in length. Bits 0–5 contain the Opcode ('14'x), bits 6–10 contain the RT register, or target, bits 11–15 contain the RA register, or source register, and bits 16-31 contain the SI field, or immediate data. When emulating a LOAD REGISTER instruction, the SI field of the PowerPC ADD IMMEDIATE instruction is zero. In FIG. 4, PATCH loads the patch register 405 with the ADD IMMEDIATE skeleton.

The Patch instruction then moves 4 bits beginning at bit position 8 of the incompatible instruction register 407 to the patch register 405 beginning at bit position 6. A Patch And Execute instruction is used to move 4 bits beginning at bit position 12 of the Incompatible Instruction Register 407 to the Patch Register beginning at bit position 11, and then load the TIQ 103, at the location specified by TIQ-AP, with the fully patched ADD IMMEDIATE instruction.

An End Routine instruction or End Routine and Delay instruction must be coded as the last instruction of a target template routine. When the AEP interprets an End Routine instruction, it goes on to process the next incompatible instruction. But, if an incompatible instruction is one that may change the sequential course of incompatible program execution or the access authority state under which it is executing, the template routine for the incompatible instruction that may cause that change must be coded to end with an End Routine and Delay instruction.

Both the End Routine instruction, and the End Routine and Delay instruction indicate to the AEP the end of a target template routine. Both are placed into the TIQ, so that when they are reached during execution of the target instructions of the translated incompatible program routine, the target processor is aware that the emulation of an incompatible instruction has completed. Then, the target processor checks for pending incompatible architecture interrupts between the emulation of incompatible instructions. When the target processor reaches an End Routine and Delay, the AEP will be signaled that the expected change has been made in the Incompatible Instruction Counter 304 or the IEVAR 303. The End Routine and End Routine and Delay instructions are special emulation functions of the target processor, but as explained earlier, programmed embodiments are possible.

Figure 5:
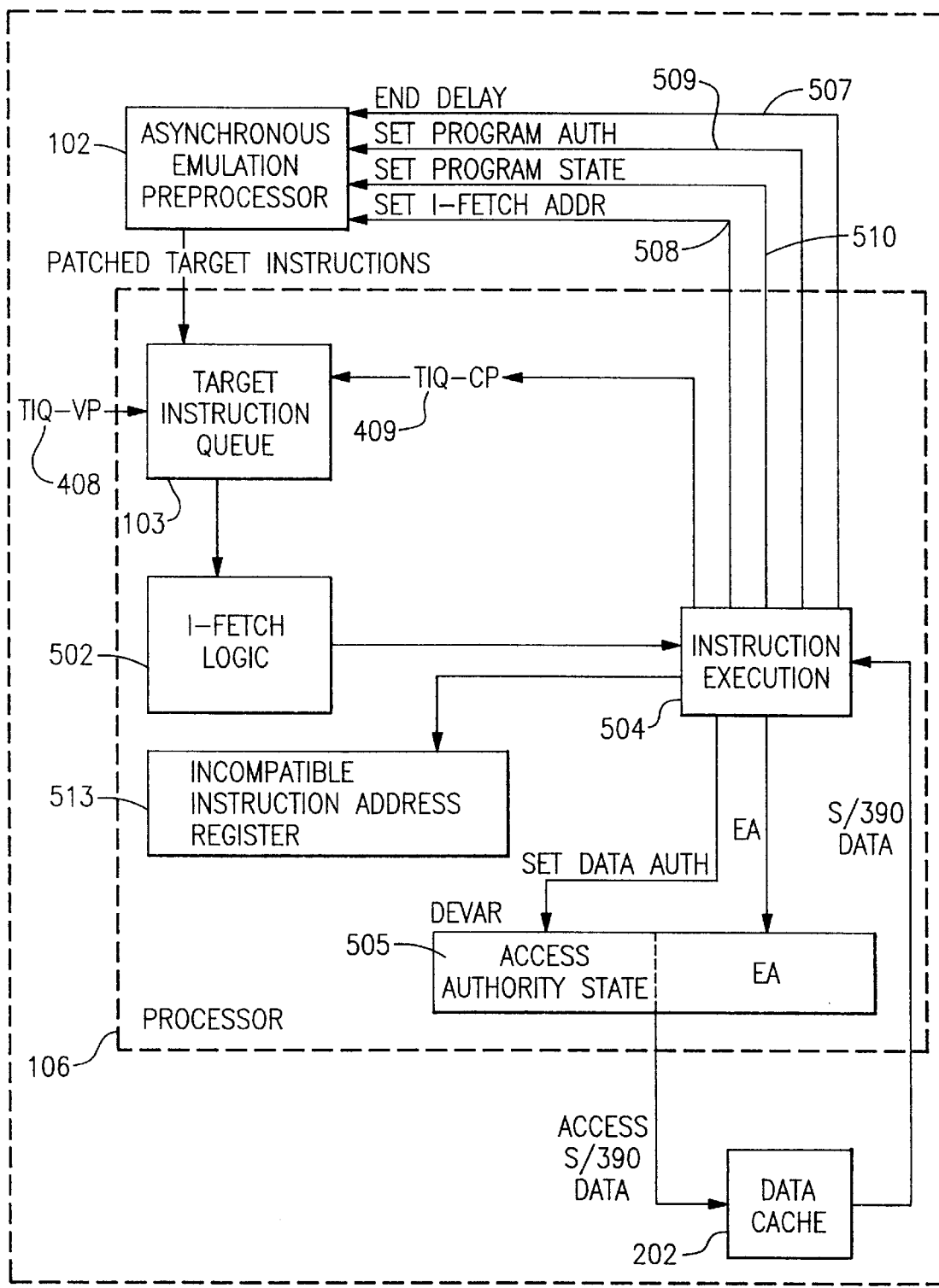
FIG. 5 shows elements of the target processor which interface and process target routine instructions provided by the AEP.

FIG. 5 illustrates parts of the target processor used for executing the target instructions of a template routine received from TIQ after preprocessing by operations of the AEP patch unit 306. FIG. 5 depicts the elements of the target processor 106 that are involved in its emulation mode operation. In emulation mode, the processor accepts the instructions in the Target Instruction Queue (TIQ) 103, which have been provided from the target template routine by the AEP 102. The I-fetch logic 502, in emulation mode, accesses the TIQ in response to a request for a new instruction by the processor instruction execution unit 504. The TIQ current pointer (TIQ-CP) 409 addresses the next instruction in the queue to be executed. This is updated as each target instruction from the queue is executed by the target processor. The TIQ valid pointer (TIQ-VP) 408 indicates the next location that will contain an instruction from the AEP for execution by the target processor, but should not now be considered valid by the target processor.

Thus, if the TIQ-CP is equal to the TIQ-VP, there is no valid instruction in the TIQ to be executed, and the target processor awaits the AEP's update of the TIQ-VP pointer. This is done by the processor continuing to compare the two pointers, or by doing that periodically if other processing can be accomplished, e.g., handling an external interruption.

Data accesses to the incompatible storage by template target instructions, during emulation processing, are made by using a Data Exploded Virtual Address Register (DEVAR) 505. The high-order part of the exploded address represents the incompatible program's current "access authority state", which for example may represent an incompatible address space and an incompatible storage key assigned to an "incompatible data" subarea within target storage area 201 in FIG. 2. The low-order part, EA, of the DEVAR address contains the incompatible effective address for the storage reference. The data is accessed by the target processor from its standard data cache 101.

The DEVAR is a target processor register assigned for emulation mode operation. Its content is managed by target instructions of the template routines. Normally the high-order part reflects the current data access authority of the incompatible program and does not change from incompatible instruction to incompatible instruction. However, when an incompatible instruction is defined to make such a change, the instructions of the routine emulating it change the high-order part of the DEVAR. No hardware modifications are made to the target processor to perform this part of the emulation.

When an incompatible instruction is to change the program access authority state of the incompatible program, or may change the sequentiality of execution of the incompatible program (e.g. a branch), the template ends with an End Routine and Delay instruction, which is placed in the TIQ by the AEP. This instruction, which can provide a program call to code in the emulator, or be a microcoded instruction, signals the AEP that it can restart its interpretation of incompatible instructions.

At the beginning of each target routine, target instructions are included to update the Processor Incompatible Instruction Address Register 513 to the address of the next incompatible instruction, which will allow the emulator program, in emulating incompatible machine interruptions, to have the address of the next incompatible instruction when an interruption is reported to the incompatible program through use of the incompatible machine architecture for such reporting. That is the point of return that will be reported by the emulator program as part of the interruption report. Register 513 is a different register than the AEP incompatible instruction counter 304, since the AEP may often run ahead of the processor in its preprocessing of incompatible instructions, and two different values must be kept, one for each purpose.

The lines: Delay 507, Set Program Authorization 509, Set Program State 510, and Set I-fetch 508 are emulation control paths from the target processor back to the AEP. Signals on these lines are used to change the IEVAR 303, the Incompatible Program state register 312, and the Incompatible Instruction Counter 304, respectively. These lines depict the logic of the process and need not represent new hardware. Target instructions of the template routines load these registers as part of emulating the incompatible instructions as appropriate under incompatible architecture rules.

FIG. 6A depicts the End Routine instruction, which contains only an opcode, and marks the end of a template routine in AEP processing and target processor execution.

FIG. 6B depicts the End Routine and Delay instruction, which also only contains an opcode, marks the end of a template routine in AEP processing and target processor execution, and additionally causes the target processor to signal to the AEP when it is executed by the target processor.

FIG. 7 depicts the Patch and Execute instruction. In addition to its identifying opcode, it contains an offset within the incompatible instruction in Patch register 405, the length in bits of the field to be moved, and the bit offset within the Patch register where it should start to overlay what is there, after which the content of the Patch register 405 is moved to the TIQ at TIQ-AP.

FIG. 8 depicts the Patch instruction. In addition to its identifying opcode, it contains an offset within the incompatible instruction of a field which must overlay the target instruction in the Patch register 405, the length in bits of the field to be moved, and the bit offset within the Patch register where it should start to overlay what is there.

FIG. 9 depicts the Set I-fetch instruction, which consists of an identifying opcode, and the incompatible address of the next instruction that should be executed in the incompatible program.

FIG. 10A shows the Set Program Authority instruction, which consists of its identifying opcode, and a specification of a target register containing a new access authority value to be used in fetching incompatible instructions.

FIG. 10B depicts the Set Data Authority instruction, which consists of its identifying opcode, and a specification of a target register containing the new access authority to be used in making data accesses for operands in the incompatible storage.

FIG. 10C depicts the format of the Set Program State instruction, which consists of its identifying opcode, and a specification of a target processor register containing a new incompatible program operating state, which is sent to IPSR 312 to be used as part of the parameter of a search argument used for the table lookup of the template routine which will most efficiently emulate the next current incompatible instruction instance.

Figure 11:
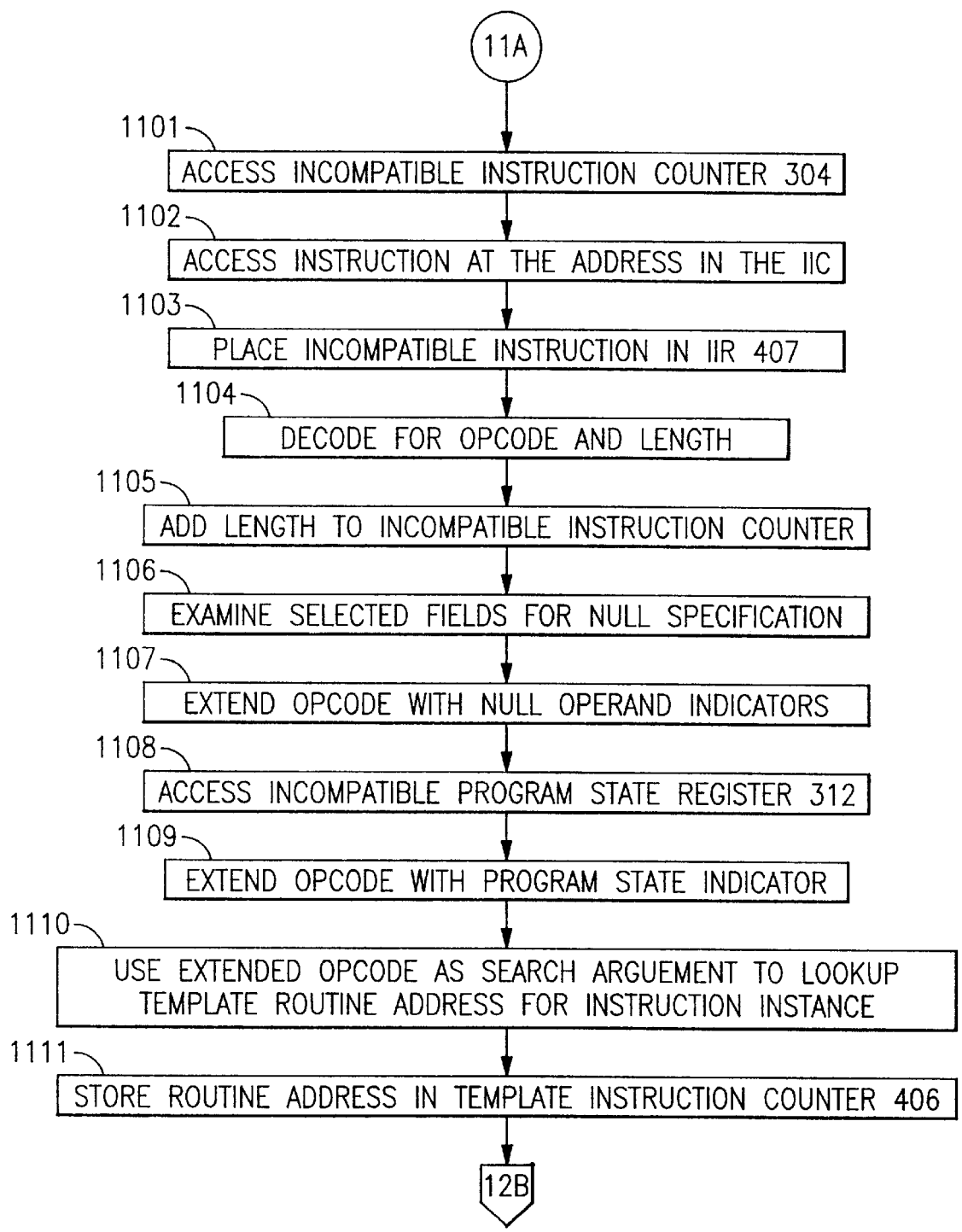
FIGS. 11, 12, 13, 14, 15 and 16 provide a flow diagram of a preferred method used by the AEP for patching target instructions in template routines for emulating incompatible instructions.

FIG. 11 is a flow chart that shows the logic of AEP preprocessing in the preferred embodiment. Entry point 11A is entered when a new incompatible instruction is to be processed by the AEP. Step 1101 accesses the Incompatible Instruction Counter (IIC) 304 to obtain the address of the next incompatible instruction to be processed. At step 1102 the AEP uses this address to access the next incompatible instruction from the incompatible storage area 201. The instruction is placed into the Incompatible Instruction Register (IIR) 407 in Patch unit 306 at step 1103. At step 1104 the accessed incompatible instruction is decoded for its opcode and its length. At step 1105, the length is added by adder 304A to the address in IIC 304 to generate the address of the next incompatible instruction.

Selected fields in the incompatible instruction are examined for null specification at 1106, and a bit mask reflecting any null fields is created. At step 1107, search argument generation is started by placing in the search argument the opcode extended by the null-specification bit mask (the search argument is to be used for a table lookup to find a template routine for the incompatible instruction instance). At step 1108, the Incompatible Program State Register (IPSR) 312 is accessed, and at step 1109 the search argument is extended by appropriate bits taken from the IPSR. The bit parameters (extending the opcode in the search argument) represent null, mode and state conditions affecting execution of the incompatible program which are supported by separate template routines for the current opcode. At step 1110 the completed search argument is used to access the Microcode Address Table to find the address of the template routine IIII coded to most efficiently handle the current incompatible instruction instance. This address may be an offset in subarea 207.

Figure 12:
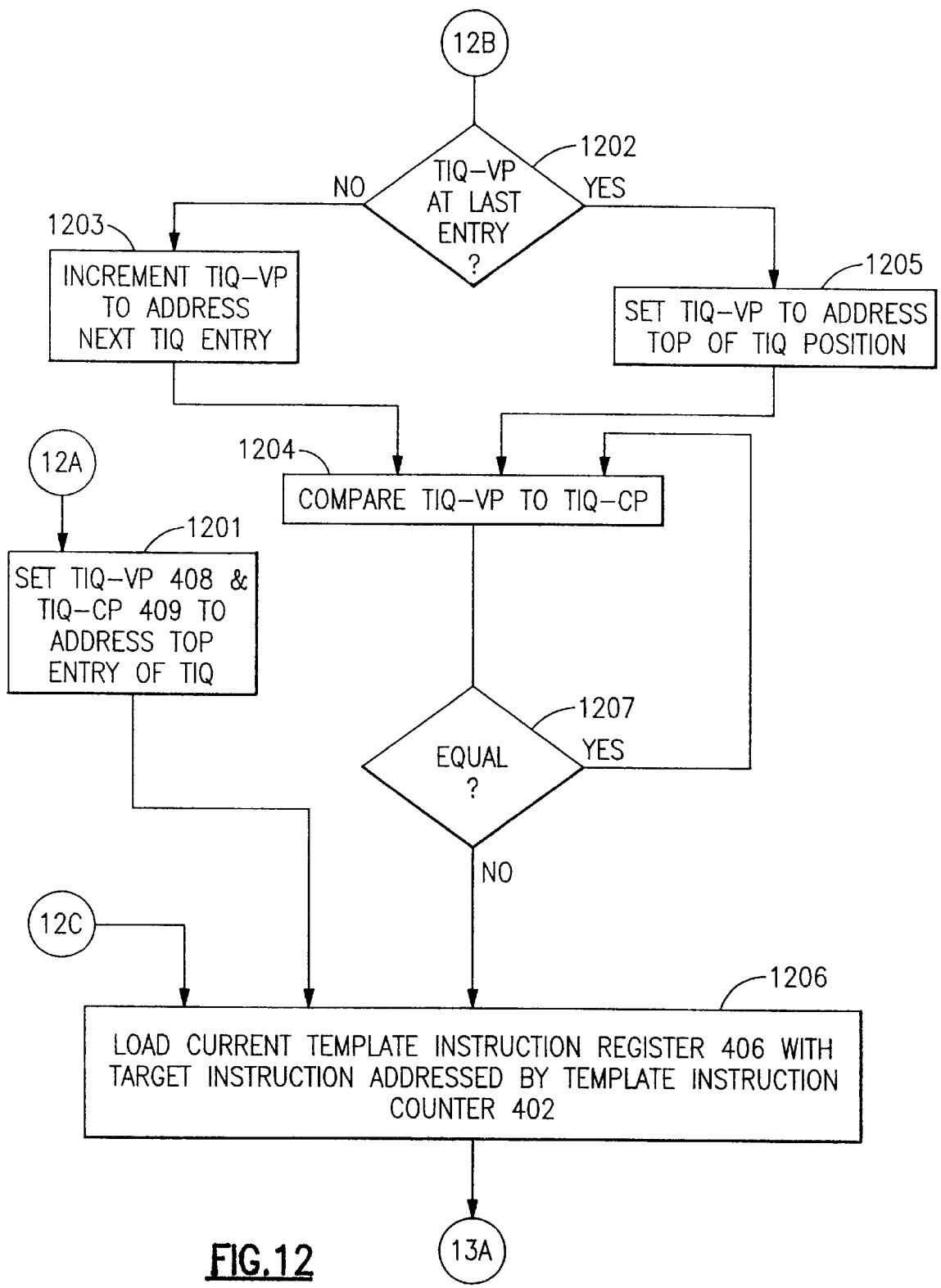

Then step 1202 is entered on FIG. 12 through connector 12B. The routine address obtained from the table lookup is loaded to the Template Instruction Counter TIC 402 in the Patch unit. Control passes to entry point 12B on FIG. 12 to perform Patch unit processing.

FIG. 12 shows the first part of the logic of the operation of the Patch unit 306. Entry point 12A is entered only at first initialization of emulation operation. Step 1201 sets the TIP-VP 408 and the TIQ-CP 409 to address the top entry of TIQ. Control passes to step 1206 where the Patch unit places a template instruction into the CTIR 406. The target processor is waiting until TIQ-CP no longer equals TIQ-VP so that it can begin executing instructions. Step 1206 loads the current template instruction register 406 with the target instruction addressed by template instruction counter 402. Control passes to entry point 13A on FIG. 13. The logic of the figure is entered at entry point 12B after a template instruction has been placed into the CTIR 406. Step 1202 tests whether the TIQ-VP is at the last TIQ entry. If it is, TIQ-VP is set to address the top entry at step 1205. If not, the TIQ-VP is incremented to address the next TIQ entry at step 1203. At step 1204 the new value of TIQ-VP is compared to the current value of TIQ-CP 409. If equal, the Patch unit must delay until the processor has freed that entry, and control passes from 1205 to 1204. The loop will continue until TIQ-VP no longer equals TIQ-CP. If step 1207 found an unequal condition, control passes to step 1206, previously described. Entry point 12C to step 1206 is used after a Patch or a Patch and Execute instruction have been processed, since they do not require the TIQ-VP to be advanced.

Figure 13:
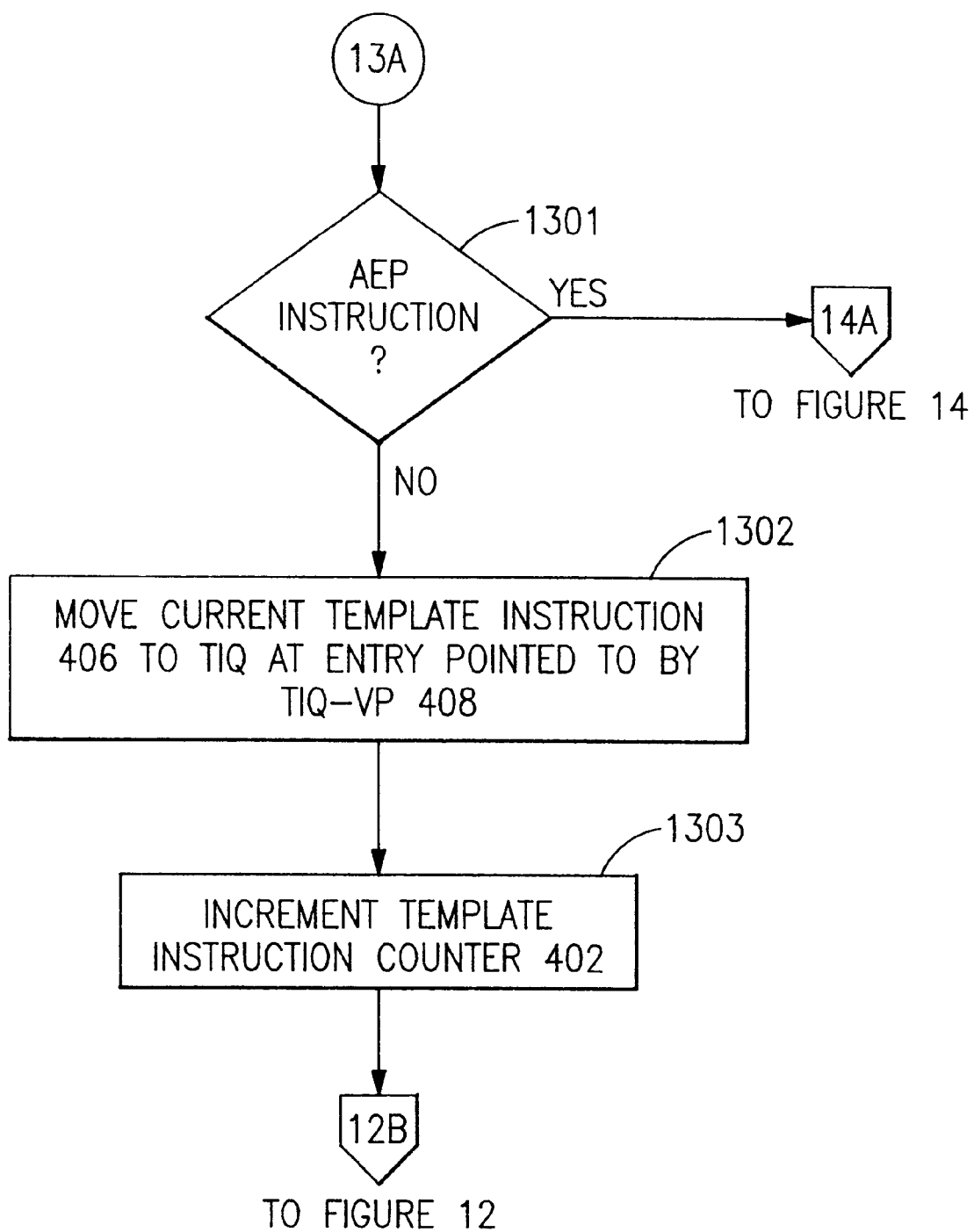

FIG. 13 is a continuation of Patch unit 306 processing. Entry is made at 13A. Step 1301 tests the instruction in the CTIR 406 for being one of those requiring special processing by the Patch unit. These include Patch, Patch and Execute, End Routine, and End Routine and Delay. If the instruction is one of these, control passes to entry point 14A on FIG. 14. Otherwise, the instruction is moved to the TIQ at the entry addressed by TIQ-VP 408 at step 1302. At step 1303 the TIC 402 is incremented to the next instruction in the target template routine. Control passes to entry point 12B on FIG. 12 to process the next instruction in the routine.

Figure 14:
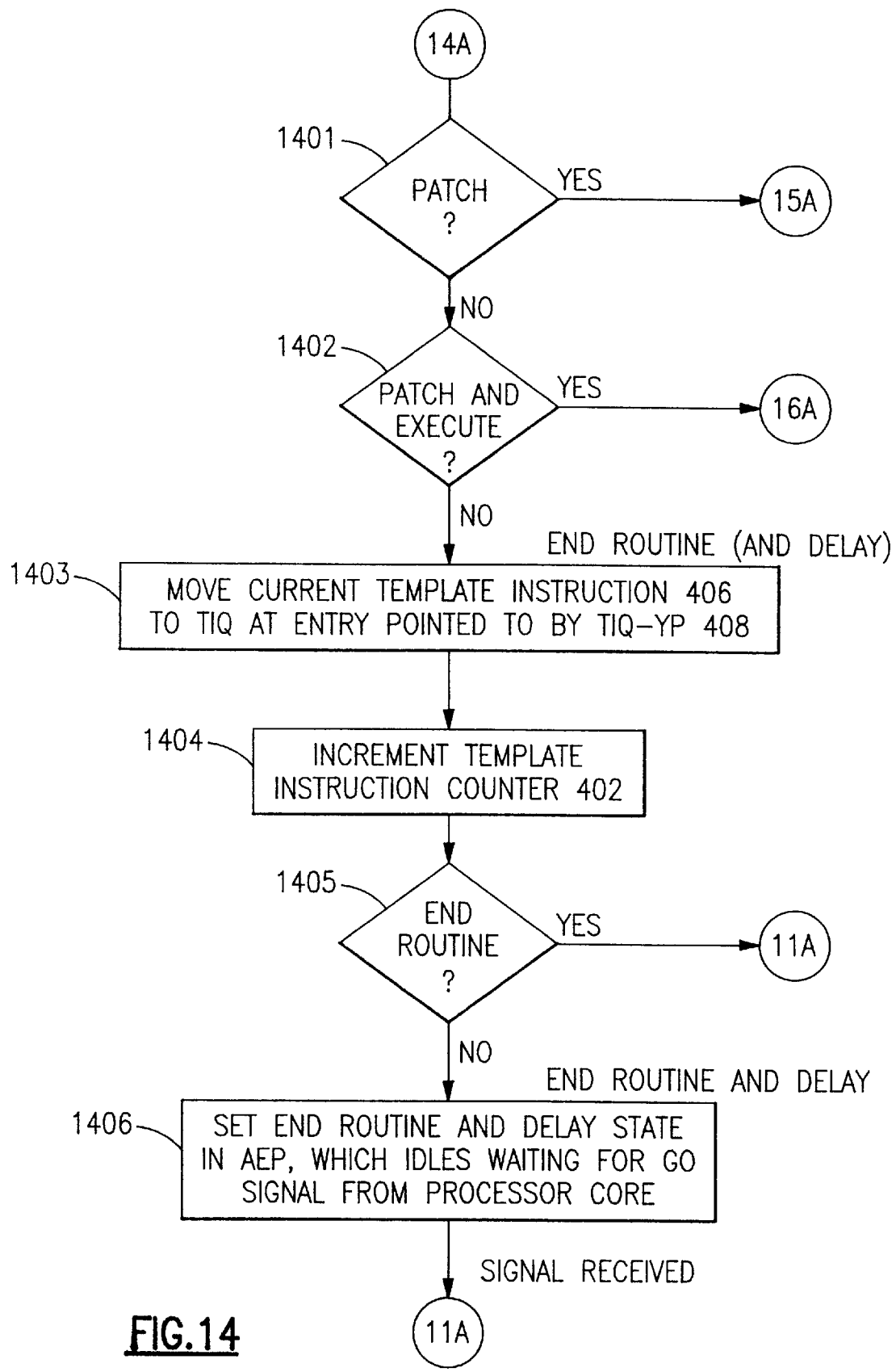

FIG. 14 shows the logic for processing instructions in the template routine that require special handling in the Patch unit. It is entered at entry 14A. At step 1401, the instruction in the CTIR 406 is tested for being a Patch instruction, and if it is, control passes to entry 15A on FIG. 15. At step 1402, the instruction in the CTIR 406 is tested for being a Patch and Execute instruction, and, if it is, control passes to entry 16A on FIG. 16. Continuation to step 1403 indicates that the current AEP instruction is either End Routine or End Routine and Delay. The instruction is moved to the TIQ at the entry addressed by TIQ-VP 408. At step 1404 the TIC 402 is incremented to the next instruction in the target template routine. At step 1405 the instruction in the CTIR 406 is tested for being an End Routine instruction, and, if it is, control passes to entry 11A on FIG. 11. If control reaches step 1406, the instruction is an End Routine and Delay instruction. The Patch unit idles until a Go signal is received from the processor. When the signal is received, control passes to entry 11A on FIG. 11 to begin preprocessing of the next incompatible instruction.

Figure 15:
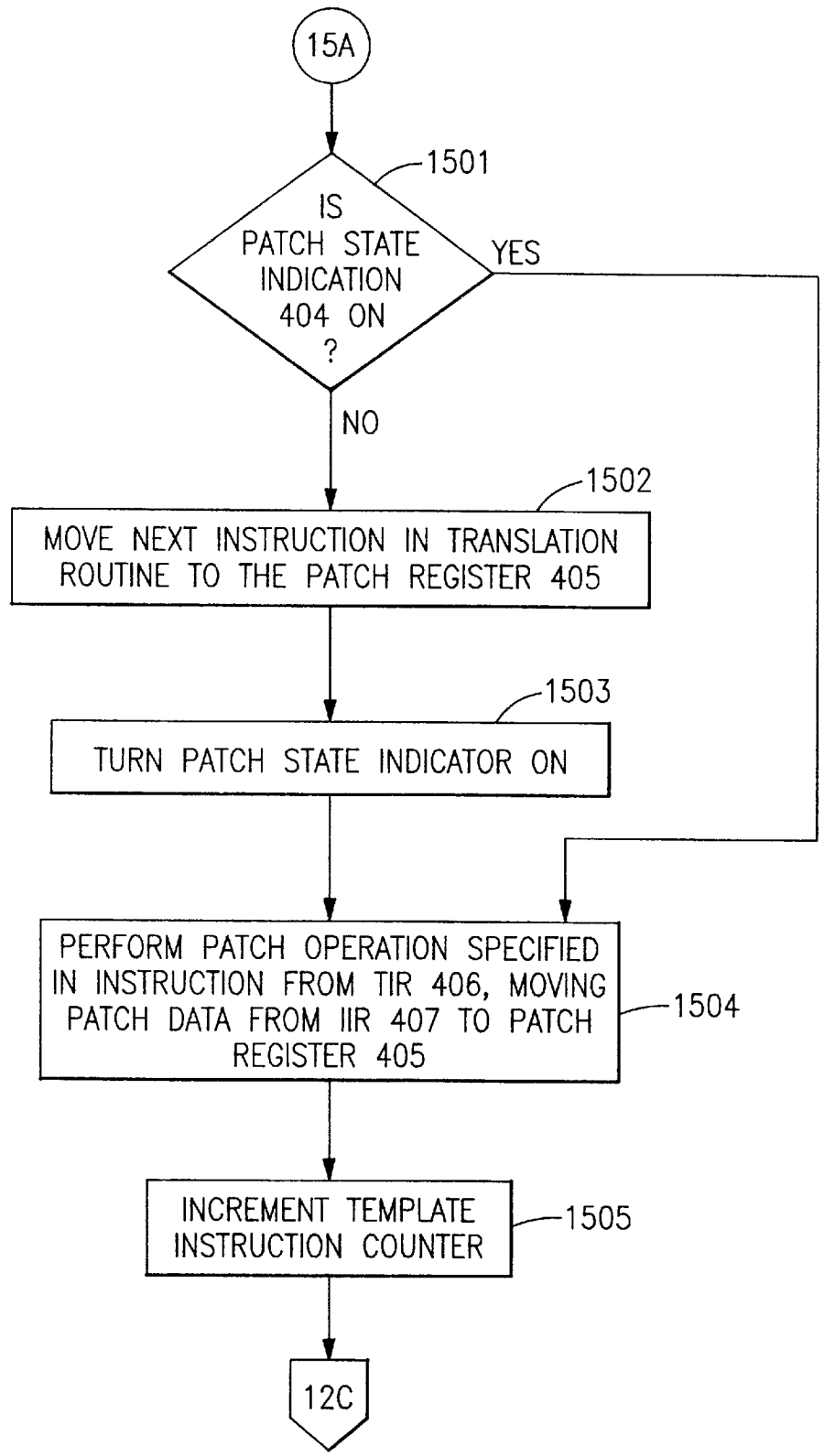

FIG. 15 shows the logic of Patch instruction processing in the Patch unit 306. It is entered at entry 15A. Step 1501 tests the PSI 404, and if it is on, control passes to step 1504. This is because a target instruction for patching is already in the Patch register 405. If the PSI is off, step 1502 moves the instruction following the Patch instruction in the template routine to the Patch Register 405. Step 1503 sets the Patch state indicator PSI 404 on to indicate that an instruction is in the Patch Register 405. Step 1504 performs the patching operation specified by the operand fields of the Patch instruction from the specified field in IIR 403 to the specified field in the Patch Register 405. The format of the Patch instruction is depicted in FIG. 8. Step 1505 increments the TIC 402 and control passes to entry 12C on FIG. 12 to examine the next instruction in the target template routine.

Figure 16:
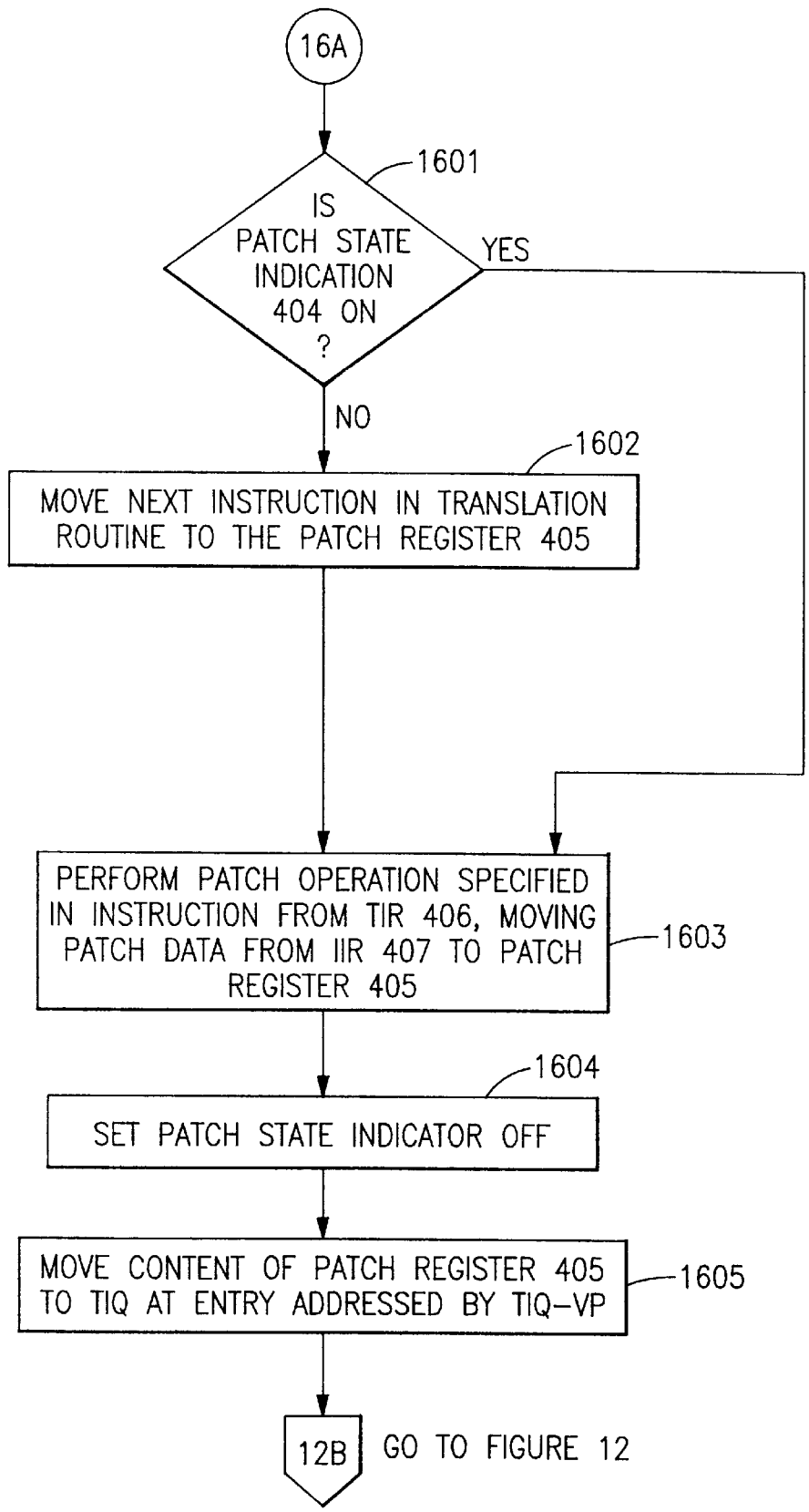

FIG. 16 shows the logic of Patch and Execute instruction processing in the Patch unit 306. Entry is made at 16A. Step 1601 tests the Patch state indicator PSI 404. If PSI is off, step 1602 moves the next instruction of the template routine to the Patch Register 405, and control passes to step 1603. If the PSI 404 is off at step 1601, an instruction has already been staged to the Patch Register 405, and control passes to step 1603. At step 1603 the patch operation specified in the Patch and Execute instruction is performed. The bits of the incompatible instruction in IIR 307 specified in the Patch and Execute instruction are moved to overwrite the specified bits in the PR 405. At step 1604 the PSI 404 is set to off. At step 1605 the content of PR 405 are moved to the TIQ 103 at the address specified by TIQ-VP 408. Control passes to entry 12B on FIG. 12.

Figure 17:
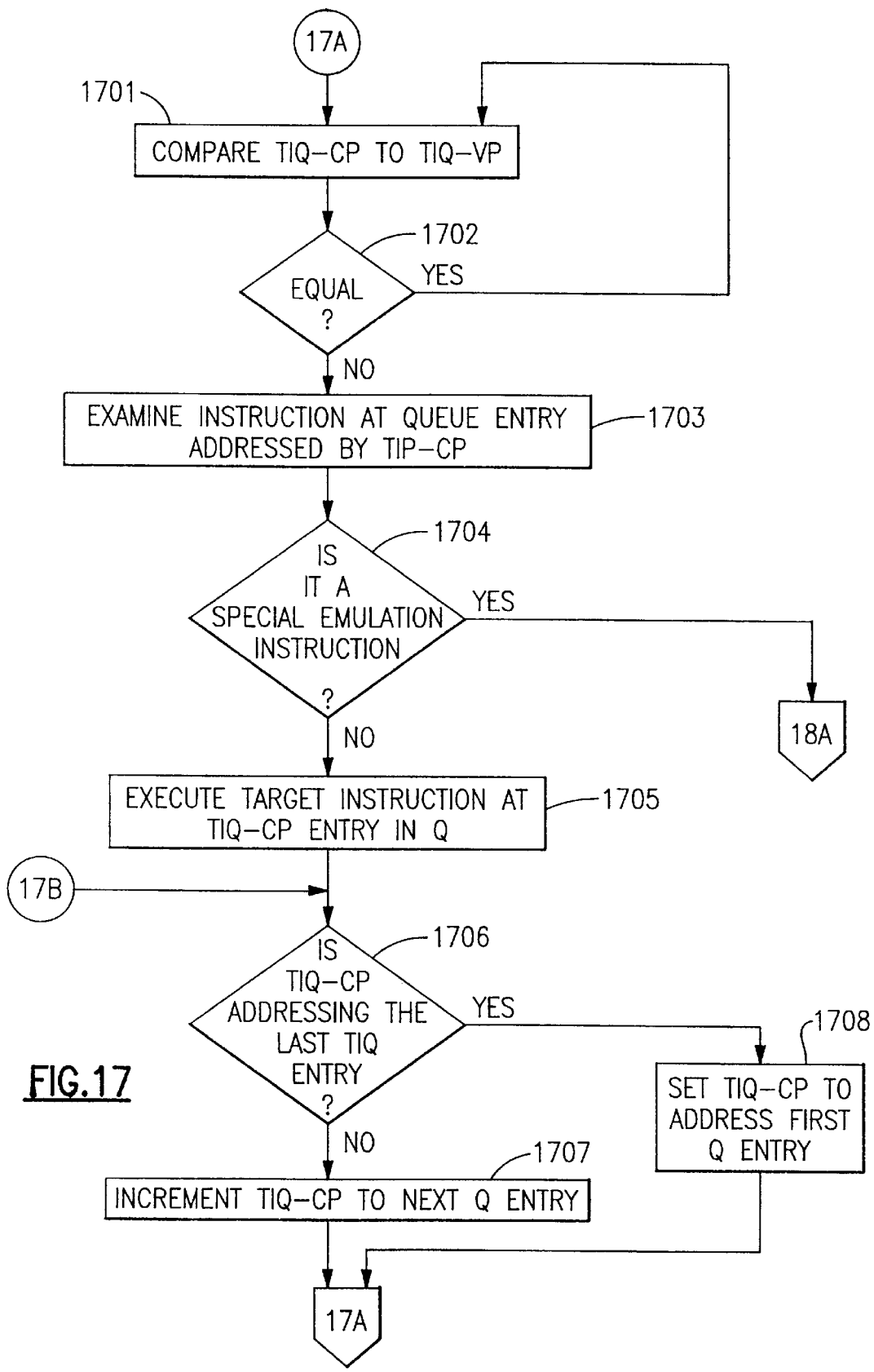
FIG. 17 provides a flow diagram of a preferred method used by the target processor for processing the target instructions of template routines which may have been patched by the processing of the AEP.

FIG. 17 shows the logic of the target processor emulation mode processing. It is entered at 17A. Step 1701 tests the value of TIQ-CP to the value of TIQ-VP, and at step 1702, if the pointers were equal, control returns to step 1701 to test again. This loop continues until there is a valid instruction for the processor to execute. If at step 1702, the pointers are found not equal, control passes to step 1703 where the instruction at the queue entry addressed by TIQ-CP is examined for execution. At step 1704, if the instruction is decoded as a special emulation mode instruction, control passes to entry 18A on FIG. 18. Otherwise, the instruction is a normal target instruction and it is executed at step 1705.

At step 1706, the TIQ-CP is tested for being the last TIQ 103 entry. If it is not, step 1707 increments the TIQ-CP to the next TIQ entry and control passes to 17A. Otherwise, at step 1708 the TIQ-CP is set to the first entry of the TIQ, and control passes to 17A.

Figure 18:
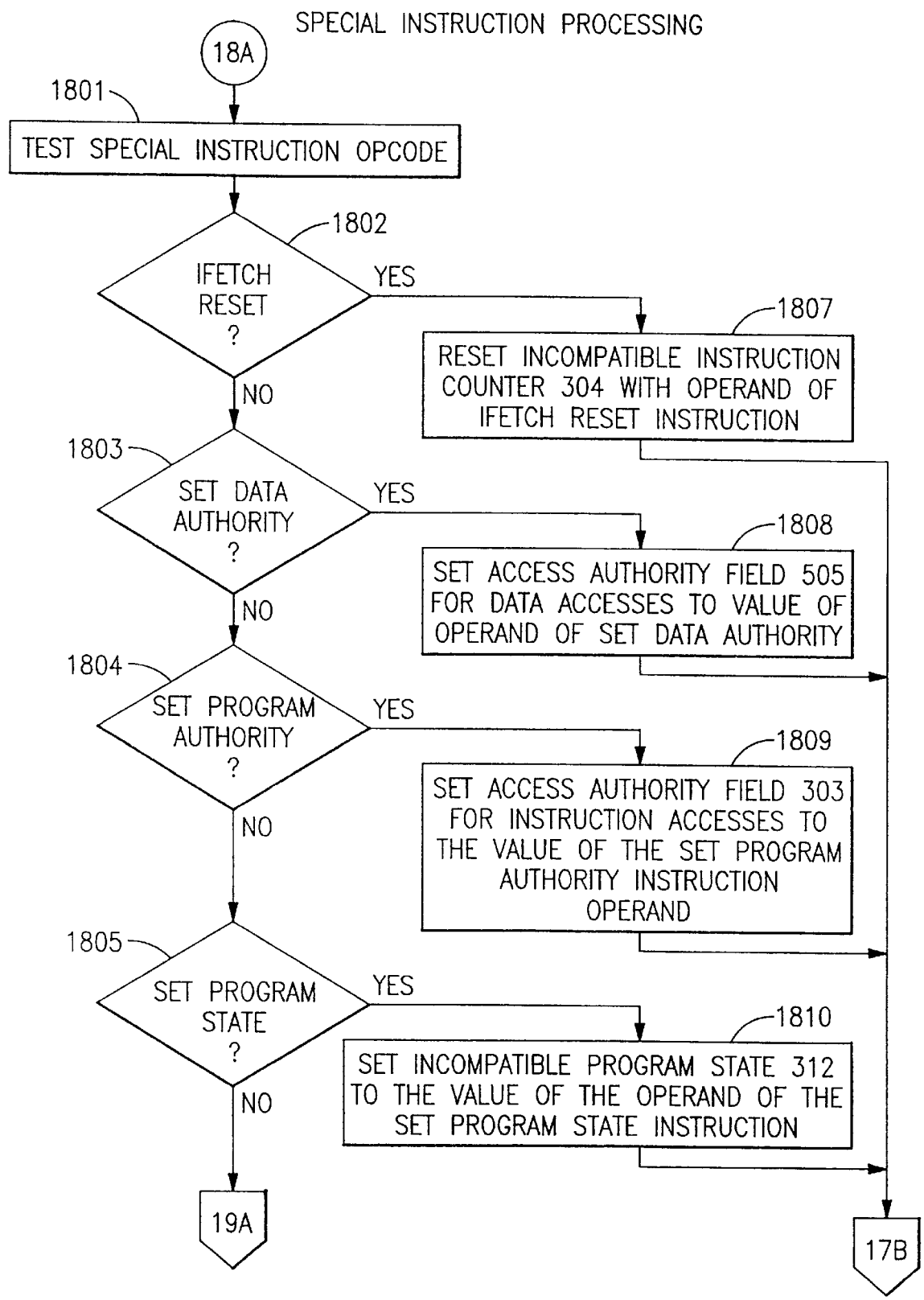
FIG. 18 and 19 show a flow diagram of a method used by the target processor for decoding and processing special emulation mode instructions.
Figure 19:
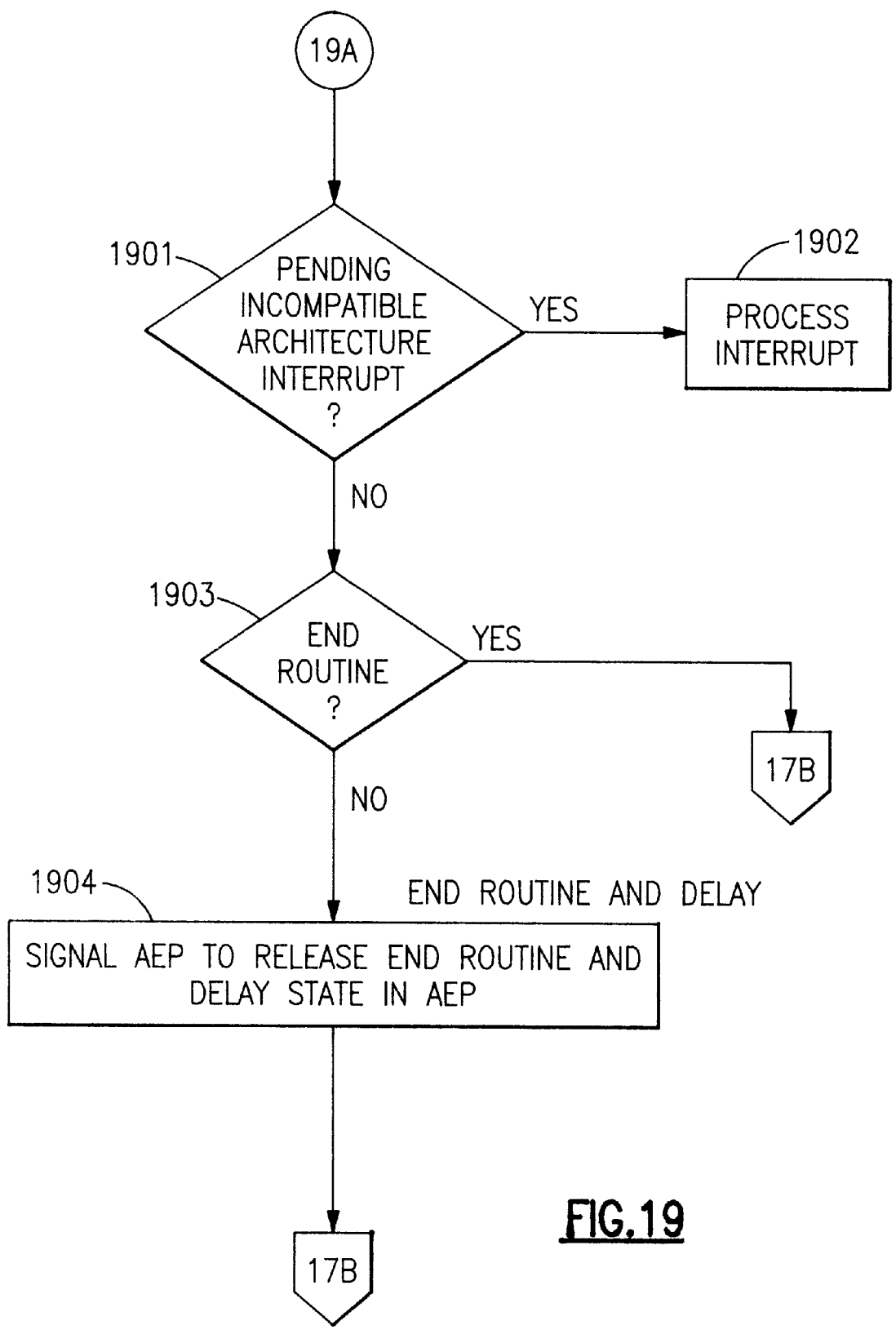

FIG. 18 and FIG. 19 depict the logic of execution of the processor's special emulation mode instructions. At FIG. 18, step 1801, the opcode of the instruction is tested. At step 1802, if it is a Set I-fetch, control passes to step 1807 where the Incompatible Instruction Counter 304 is set to the new value provided by the Set l-fetch instruction. Control passes to entry 17B on FIG. 17. If not a Set I-fetch, step 1803 tests the opcode for Set Data Authority. If it is, step 1808 sets the access authority field of the DEVAR 505 for operand data accesses to the value specified by the operand of the Set Data Authority instruction. Control passes to entry 17B on FIG. 17. If not a Set Data Authority, step 1804 tests for Set Program Authority, if it is, at step 1809 the access authority field in the IEVAR 303 for incompatible instruction fetches is set to the value specified by the operand of the instruction. Control passes to entry 17B on FIG. 17. If the special instruction is found to be a Set Program State at step 1805, the Incompatible Program State register 312 is set to the value specified by the operand of the instruction at step 1810. Control passes to entry 17B on FIG. 17. If not, control passes to entry 19A on FIG. 19. At step 1901 the instruction is an End Routine or an End Routine and Delay instruction. A test is made for any pending incompatible architecture interrupts at step 1902. If interrupts are pending, control is passed to the emulator program 107, which will emulate the incompatible interruption to the incompatible program in accordance with the incompatible architecture for such interrupts. If no incompatible architecture interrupts are pending, step 1903 tests for End of Routine. If it is, control passes to entry 17B on FIG. 17. If not, the opcode is End Routine and Delay, and the AEP is signaled to reset the End Routine and Delay State 1904 and resume template routine preprocessing. Control passes to entry 17B on FIG. 17.

In an alternative embodiment, the AEP may implement a form of branch history table so that it does not have to wait at conditional branches. It can maintain a table of recently executed incompatible unconditional branch instructions, and whether they successfully branched or not. When an unconditional branch is to be executed, its incompatible storage location is added to the table if it is not already there.

Following the signal from the target processor, the incompatible instruction counter 304 can be tested to see if a non-sequentiality has occurred. If so, the branch is marked as successful in the table. Otherwise, the branch is marked as having been unsuccessful. When an incompatible branch instruction is to be executed that already is in the table, the AEP assumes that the branch instruction will have the same result as the last time it was executed. It follows this path in its preprocessing on the assumption the incompatible program will in fact follow that path. However, it does not move TIQ-AP beyond the branch instruction until the branch instruction has been completed by the processor and the true result is known. If the expected result occurred, TIQ-VP can be moved past the instructions already processed by the AEP. If the opposite result was obtained from the branch instruction, the branch history table is changed to reflect the new expected result, and any preprocessed instructions abandoned.

Where a conditional branch is not in the table, the AEP may assume one or the other result. Of course many other algorithms may be experimented with for first-time-encountered branches, or where the result is not as recorded in the branch history table, to discover what provides the best performance in a particular programming environment.

While we have described our preferred embodiments of our invention, it will be understood that those skilled in the art, both now and in the future, may make various improvements and enhancements which fall within the scope of the claims, which follow. These claims should be construed to maintain the proper protection for the invention first disclosed herein.

What is claimed is:

1. An emulation method for executing an incompatible computer program containing computer instructions of a computer architecture incompatible with target architecture used by the target processor, the emulation method comprising
    storing in a storage of the target processor an incompatible program comprised of incompatible instructions to be emulated by the target processor, and storing in the storage of the target processor one or more template routines for each operation code of each incompatible instruction contained of the incompatible program,
    accessing from the storage into a first portion of an incompatible instruction interpreter each incompatible instruction to be emulated,
    executing an emulation preprocessing method for each accessed incompatible instruction, the preprocessing method generating a search argument in a second portion of the incompatible instruction interpreter by performing the steps of:
        placing an operation code of the accessed incompatible instruction in the search argument,
        sensing the accessed incompatible instruction to determine if any other component of the instruction is required in the search argument for enabling a selection of a preferred target routine among plural target routines stored for the operation code of the instruction,
        transferring each required component of the incompatible instruction into the second portion of the incompatible instruction interpreter in combination with the opcode to generate the search argument,
        searching a template address table with the search argument to find a corresponding template address associated with the search argument to select the template routine among a plurality of template routines associated with the same operation code,
        accessing each template instruction in the template routine at the corresponding template address, and
        preprocessing each template instruction in the template routine in preparation for emulating the accessed incompatible instruction by execution of the template routine in the target processor after each target instruction in the template routine is preprocessed.

2. A method for emulating an incompatible computer program on a target processor as defined in claim 1, the emulation method emulating a non-sequential address for a next incompatible instruction to be emulated in an incompatible program, including the steps of:
    concurrently executing a current target routine in the target processor for an incompatible instruction emulated immediately prior to the accessed incompatible instruction in the sequence of executions of incompatible instructions for the incompatible program,
    generating a search argument component by execution of the current target routine during the concurrent executing step when the associated incompatible instruction determines a mode or state of operation for subsequently executed incompatible instructions in the incompatible program, the incompatible mode or state being defined in the architecture of the incompatible program which need not be a mode or state defined in an architecture of the target processor,
    transferring the search argument component into the second portion of the incompatible instruction interpreter to be included in the search argument generated therein, and
    utilizing the search argument to search the template address table to obtain a template address of a stored template routine for emulating the accessed incompatible instruction in the incompatible mode or state determined by the concurrently executing step.

3. A method for emulating an incompatible computer program on a target processor as defined in claim 2, the emulation method emulating a non-sequential address for a next incompatible instruction to be emulated in an incompatible program, including:
    temporarily storing the search argument component in an incompatible program state register prior to transferring the search argument component into the second portion of the incompatible instruction interpreter.

4. A method for emulating an incompatible computer program on a target processor as defined in claim 2, the emulation method emulating a non-sequential address for a next incompatible instruction to be emulated in an incompatible program, including having:

accessing an entry point in a template routine at the template address, wherein the template address is an entry point for obtaining emulation of the accessed incompatible instruction in the mode or state determined by the transferred search argument component.

5. A method for emulating an incompatible computer program on a target processor as defined in claim 4, the emulation method emulating a non-sequential address for a next incompatible instruction to be emulated in an incompatible program, including having:

each different entry point in a template routine being considered as an access of a different template routine.

6. A method for emulating an incompatible computer program on a target processor as defined in claim 2, the emulation method emulating a non-sequential address for a next incompatible instruction to be emulated in an incompatible program, including having:

the concurrently executing step setting for the incompatible program any mode including a real addressing mode, a single-address-space virtual addressing mode, and a multiple-address-space virtual addressing mode.

7. An method for emulating an incompatible computer program on a target processor as defined in claim 1, the emulation method further comprising the steps of:

generating a next sequential incompatible instruction address contiguous with a storage location containing the accessed incompatible instruction, saving the next sequential incompatible instruction address in an incompatible instruction address register, and accessing the next sequential incompatible instruction from storage at the next sequential incompatible instruction address if no address-modifying feedback signal is generated by emulation of the preprocessed template routine of the accessed incompatible instruction, whereby the address-modifying feedback signal enables the executing incompatible program to switch execution to any incompatible instruction as a next instruction to be emulated for the incompatible program by the target processor and/or to modify the incompatible authority for the execution of the next incompatible instruction.

8. An method for emulating an incompatible computer program on a target processor as defined in claim 7, the emulation method further comprising the steps of:

executing each preprocessed target instruction of the template routine beginning at the template address obtained for the accessed incompatible instruction, indicating by the executing step if the template routine has generated an address modification for a next incompatible instruction to be accessed in the emulation of the incompatible program, and changing the next sequential incompatible instruction address with the address modification to enable a non-sequential next instruction address in the incompatible instruction address register for accessing a next incompatible instruction to be emulated in the incompatible program.

9. An method for emulating an incompatible computer program on a target processor as defined in claim 8, the emulation method further comprising the steps of:

temporarily storing the address modification in a field of an incompatible instruction address register to change the address of the next incompatible instruction to be accessed for emulation in the incompatible program.

10. An method for emulating an incompatible computer program on a target processor as defined in claim 9, the emulation method further comprising the steps of:

handling addresses in the incompatible instruction address register as target processor virtual addresses exploded to represent all authority states utilizable by the incompatible program, and handling data addresses obtained from emulation of the incompatible instructions as exploded virtual addresses, whereby the virtual addresses require address translation to target processor absolute addresses used for accessing incompatible instructions and operands in target processor storage.

11. An emulation method for emulating an incompatible computer program on a target processor as defined in claim 8, the emulation method emulating a non-sequential address for a next incompatible instruction to be emulated in an incompatible program, including the steps of:

structuring fields in the incompatible instruction address register to include an authority field and a location field, and setting the authority field and a location field to represent the address of the next incompatible instruction to be accessed from target processor storage, generating by emulation of a current template routine an address modification to represent a change in authority for a next incompatible instruction to be accessed for incompatible program, and setting the address modification into the authority field in the incompatible instruction address register for controlling the address to be used for accessing the next incompatible instruction to be emulated for the incompatible program.

12. An emulation method for emulating an incompatible computer program on a target processor as defined in claim 10, the emulation method emulating a non-sequential address for a next incompatible instruction to be emulated in an incompatible program, including the steps of:

generating by emulation of a current template routine an address modification to represent a change in a next incompatible instruction to be accessed for incompatible program, and setting the address modification into the location field in the incompatible instruction address register for controlling a next address to be accessed for obtaining a next incompatible instruction to be emulated for the incompatible program, whereby the address modification causes a branch in the execution of the incompatible program.

13. An emulation method for emulating an incompatible computer program on a target processor as defined in claim 11, the emulation method further including the steps of:

storing any modification to the next incompatible instruction address in the incompatible instruction address register prior to the completion of a currently emulated incompatible instruction to assure availability of the next incompatible instruction address to be emulated if an interruption occurs to the incompatible program immediately after completion of target processor execution of the currently emulated incompatible instruction.

14. An emulation method for emulating an incompatible computer program on a target processor as defined in claim 13, the emulation method further comprising changing the authority field of the incompatible instruction address register to indicate a different access authority representing a different incompatible virtual address space for subsequent emulation of the incompatible program.

15. An emulation method for emulating an incompatible computer program on a target processor as defined in claim 13, the emulation method further comprising changing the authority field of the incompatible instruction address register to represent a different real storage key for restricting access by the incompatible program to a predetermined incompatible real address space mapped to the storage of the target processor.

16. An emulation method for emulating an incompatible computer program on a target processor as defined in claim 1, the emulation method further comprising storing in a target processor storage a template routine for reducing the number of target instructions executed for the template routine when the accessed incompatible instruction contains at least one operand having a predetermined value, and detecting if the predetermined value exists as an operand of the accessed incompatible instruction and, placing the predetermined value in the search argument to enable the search argument to be used in a search of the template address table to find a template routine for handling the incompatible instruction with reduced instruction execution to reflect the predetermined value for which operand execution handling is predetermined.

17. An emulation method for emulating an incompatible computer program on a target processor as defined in claim 16, the emulation method further comprising specifying a null value as the predetermined value of the incompatible instruction operand.

18. An emulation method for emulating an incompatible computer program on a target processor as defined in claim 16, the emulation method further comprising providing plural entry points in a target routine to be accessed by different template addresses provided in the template address table to handle different execution states and/or predetermined operand conditions for the accessed incompatible instruction.

19. An emulation method for emulating an incompatible computer program on a target processor as defined in claim 16, the emulation method further comprising providing a plurality of target routines located by different template addresses provided in the template address table to handle different execution states and/or predetermined operand conditions for the accessed incompatible instruction, and reflecting the different execution states and/or predetermined operand conditions for the accessed incompatible instruction in the search argument generated for the accessed incompatible instruction whenever any of the execution states and/or predetermined operand conditions are found in the accessed incompatible instruction.

20. An emulation method for executing an incompatible computer program containing computer instructions of a computer architecture incompatible with target architecture used by the target processor, the emulation method comprising storing in a storage of the target processor one or more template routines for each operation code provided in each incompatible instruction of an incompatible program to be emulated on the target processor, accessing from the storage each next incompatible instruction to be emulated for the incompatible program, executing an interpreter method for each accessed incompatible instruction, the interpreter method generating a search argument for searching in a template address table for a template address of an associated template routine which can most efficiently emulate the accessed incompatible instruction when plural template routines are stored for the opcode of the accessed incompatible instruction, the interpreter method generating the search argument by performing the steps of placing at least the opcode of the accessed incompatible instruction in the search argument, sensing a state of one or more predetermined operand field(s) in the accessed incompatible instruction to determine if the operand field(s) are set to a predetermined value, setting the search argument to indicate the state of the sensed predetermined operand field(s) in combination with the opcode, and searching the table with the search argument after its generation is completed to obtain an address of the most efficient stored template routine for the incompatible instruction.

21. An emulation method for emulating an incompatible computer program on a target processor as defined in claim 20, the emulation method further comprising detecting for a null value as the predetermined value.

22. An emulation method for executing an incompatible computer program containing computer instructions of a computer architecture incompatible with target architecture used by the target processor, the emulation method comprising storing in a storage of the target processor one or more template routines for each operation code provided in each incompatible instruction of an incompatible program to be emulated on the target processor, utilizing a preprocessing operation for each incompatible instruction to be emulated, including fetching from the storage a current incompatible instruction to be emulated next by the target processor, generating a search argument for searching in a template address table to obtain a current template address of a current template routine, fetching template instructions for the current template routine from the storage of the target processor, generating a next incompatible address for accessing a next incompatible instruction from the storage by adding the length of a current incompatible instruction to the address of the current incompatible instruction, preprocessing each fetched template instruction of the current template routine, and sending to a target processor execution unit each preprocessed template instruction which is to be executed by the target processor, preprocessing an end-routine template instruction for indicating an end of the current template routine at least when the current incompatible instruction is a branch-type of incompatible instruction for determining a next instruction address to be emulated for the incompatible program, sending the end-routine template instruction to a target processor execution unit as an indication of the end of emulation for the current incompatible instruction to indicate a branch instruction has been completed and the next incompatible instruction address has been obtained by a prior template instruction for the current template routine being emulated by the target processor to specify the next incompatible address for the generating step, and delaying use of the next incompatible address for accessing the next incompatible instruction from the storage until the target processor signals execution of the end-routine template instruction for the current incompatible instruction to indicate the next incompatible address has been replaced with the branch address for the next incompatible instruction required by the incompatible program.

23. An emulation method for emulating an incompatible computer program on a target processor as defined in claim 22, the emulation method further comprising providing in the current template routine a template target instruction for changing the address of the next incompatible instruction.

24. An emulation method for executing an incompatible computer program containing computer instructions of a computer architecture incompatible with target architecture used by the target processor, the emulation method comprising storing in a storage of the target processor one or more template routines for each operation code provided in each incompatible instruction of an incompatible program to be emulated on the target processor, utilizing a preprocessing operation for each incompatible instruction to be emulated, including fetching from the storage a current incompatible instruction to be emulated next by the target processor, generating a search argument for searching in a template address table to obtain a current template address of a current template routine, fetching template instructions for the current template routine from the storage of the target processor, generating a next incompatible address for accessing a next incompatible instruction from the storage by adding the length of a current incompatible instruction to the address of the current incompatible instruction, preprocessing each fetched template instruction of the current template routine, and sending to a target processor execution unit each preprocessed template instruction which is to be executed by the target processor, preprocessing an end-routine template instruction for indicating an end of the current template routine at least when the current incompatible instruction contributes to a change in access authority for a next incompatible instruction to be emulated for the incompatible program, sending the end-routine template instruction to a target processor execution unit as an indication of the end of emulation for the current incompatible instruction, and the target processor execution unit indicating completion of the change of the access authority for the next incompatible address of the last generating step, and delaying use of the next incompatible address for accessing the next incompatible instruction from the storage until the target processor signals execution of the end-routine template instruction for the current incompatible instruction to indicate the access authority value has been replaced with the new access authority value for the next incompatible instruction required by the incompatible program.

25. An emulation method for emulating an incompatible computer program on a target processor as defined in claim 24, the emulation method further comprising changing an access authority representing an incompatible virtual address space, or a real storage key.

26. An emulation method for emulating an incompatible computer program on a target processor as defined in claim 25, the emulation method further comprising providing in the current template routine a template target instruction for changing the program access authority of the incompatible instruction.

27. An emulation method for executing an incompatible computer program containing computer instructions of a computer architecture incompatible with target architecture used by the target processor, the emulation method comprising storing in a storage of the target processor one or more template routines for each operation code provided in each incompatible instruction of an incompatible program to be emulated on the target processor, utilizing a preprocessing operation for each incompatible instruction to be emulated, including fetching from the storage a current incompatible instruction to be emulated next by the target processor, generating a search argument for searching in a template address table to obtain a current template address of a current template routine, fetching template instructions for the current template routine from the storage of the target processor, generating a next incompatible address for accessing a next incompatible instruction from the storage by adding the length of a current incompatible instruction to the address of the current incompatible instruction, preprocessing each fetched template instruction of the current template routine, and sending to a target processor execution unit each preprocessed template instruction which is to be executed by the target processor, preprocessing an end-routine template instruction for indicating an end of the current template routine at least when the current incompatible instruction contributes to a change in program state for a next incompatible instruction to be emulated for the incompatible program, sending the end-routine template instruction to a target processor execution unit as an indication of the end of emulation for the current incompatible instruction, and the target processor execution unit indicating completion of the change of the program state for the next incompatible address of the last generating step, and delaying use of the next incompatible address for accessing the next incompatible instruction from the storage until the target processor signals execution of the end-routine template instruction for the current incompatible instruction to indicate the change in program state has occurred.

28. An emulation method for emulating an incompatible computer program on a target processor as defined in claim 27, the emulation method further comprising providing in the current template routine a template target instruction for changing the program state.

29. An emulation method for emulating an incompatible computer program on a target processor as defined in claim 2, the emulation method further comprising utilizing the target processor to perform all of emulation operations, including all preprocessing operations and all target processor operations.

30. An emulation method utilizing an asynchronous emulation processor (AEP) for executing an incompatible computer program containing computer instructions of a computer architecture incompatible with target architecture used by the target processor, the emulation method comprising storing in a target system memory one or more target routines for each operation code provided in the incompatible instructions of the incompatible program, and each target routine performing a function similar to, but not necessarily identically to, a corresponding incompatible instruction, each target routine containing one or more routine instructions comprising target instructions and none, one or more patching instructions associated with any target instruction in the target routine, performing by the AEP the following steps:

accessing from storage each next incompatible instruction to be emulated for an incompatible program, including accessing sequential and non-sequential instructions in a sequence of instruction instances required for executing the incompatible program, utilizing contents of each accessed incompatible instruction, including at least an opcode, to select a corresponding target routine for emulating the accessed incompatible instruction, detecting in the corresponding target routine any first patching instruction associated with a target instruction for indicating the target instruction requires modification for enabling the target routine to provide execution results identical to execution results defined by the incompatible architecture for the corresponding incompatible instruction, setting-on a patching state for the associated target instruction when the detecting step detects any first patching instruction associated with the target instruction, executing any following routine instruction(s) as patching instruction(s) to modify the associated target instruction during existence of the patching state, further detecting an execute instruction following the first patching instruction for setting-off the patching state to a non-patching state to indicate a completion of modification of the associated target instruction, moving each modified associated target instruction to a target instruction queue TIQ) for execution by the target processor in response to the execute instruction, and moving to the TIQ without modification any target instruction in the target routine if no patching instruction is detected as being associated with the target instruction, and performing by the target processor the following step:

executing by the target processor each modified, and any unmodified, target instruction found in the TIQ to emulate the incompatible program by providing execution results identical to execution results required for the accessed incompatible program.

31. An emulation method utilizing an asynchronous emulation processor (AEP) for executing an incompatible computer program as defined in claim 30, the emulation method further comprising executing by the AEP the patching of target instructions in each corresponding target routine in the order found in the corresponding target routine, and executing by the target processor the modified and unmodified target instructions in the TIQ in the order that the instructions are moved to the TIQ by the AEP.

* * * * *

UNITED STATES PATENT AND TRADEMARK OFFICE
CERTIFICATE OF CORRECTION

PATENT NO. : 6,075,937
DATED : June 13, 2000
INVENTOR(S) : Scalzi et al

It is certified that error appears in the above-identified patent and that said Letters Patent are hereby corrected as shown below: Title page, item [54] and col. 1, Title which reads "Preprocessing of Stored Target Routines for Controlling Emulation of Incompatible Instructions on a Target Processor and Utilizing Target Processor Feedback for Controlling Non-Sequential Incompatible Instruction Emulation" should read--Preprocessing of Stored Target Routines for Controlling Emulation of Incompatible Instructions on a Target Processor, including Efficient Selection Among Multiple Target Routines per Incompatible Operation Code, and Utilizing Target Processor Feedback for Controlling Non-Sequential Incompatible Instruction Emulation--

Column 34, line 9 reads "TIQ)" and should read--(TIQ)--

Signed and Sealed this

Tenth Day of April, 2001

*Attest:*

NICHOLAS P. GODICI

*Attesting Officer*     *Acting Director of the United States Patent and Trademark Office*